United States Patent
Shahrzad et al.

(10) Patent No.: US 11,288,579 B2
(45) Date of Patent: Mar. 29, 2022

(54) TRAINING AND CONTROL SYSTEM FOR EVOLVING SOLUTIONS TO DATA-INTENSIVE PROBLEMS USING NESTED EXPERIENCE-LAYERED INDIVIDUAL POOL

(71) Applicant: Cognizant Technology Solutions U.S. Corporation, College Station, TX (US)

(72) Inventors: Hormoz Shahrzad, Dublin, CA (US); Babak Hodjat, Dublin, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 925 days.

(21) Appl. No.: 16/038,074

(22) Filed: Jul. 17, 2018

(65) Prior Publication Data

US 2018/0322395 A1 Nov. 8, 2018

Related U.S. Application Data

(63) Continuation-in-part of application No. 15/146,846, filed on May 4, 2016, now Pat. No. 10,430,709, and (Continued)

(51) Int. Cl.
*G06N 3/12* (2006.01)
*G06N 5/02* (2006.01)
(Continued)

(52) U.S. Cl.
CPC ............ *G06N 3/126* (2013.01); *G06N 5/025* (2013.01); *G06N 7/02* (2013.01); *G06N 20/10* (2019.01)

(58) Field of Classification Search
CPC ........ G06N 3/126; G06N 5/025; G06N 20/10; G06N 7/02
See application file for complete search history.

(56) References Cited

U.S. PATENT DOCUMENTS 5,845,266 A 12/1998 Lupien et al.
5,920,848 A 7/1999 Schutzer et al.
(Continued)

FOREIGN PATENT DOCUMENTS

EP 2422276 2/2012
EP 2422278 2/2012
(Continued)

OTHER PUBLICATIONS

International Search Report and Written Opinion for PCT Application No. PCT/US18/66610, dated Apr. 15, 2019, 8 pp.
(Continued)

*Primary Examiner* — Eric Nilsson
(74) *Attorney, Agent, or Firm* — Dawn-Marie Bey; Bey & Cotropia PLLC

(57) ABSTRACT

Roughly described, in an evolutionary technique for finding optimal solutions to a provided problem, a computer system uses a grouping algorithm that is better able to find diverse and optimum solutions in data mining environment with multiple solution landscapes and a plurality of candidate individuals. Each candidate individual identifies with a potential solution, and is associated with a testing experience level and one or more partition tags. Each candidate individual is assigned into one of a plurality of competition groups in dependence upon the individual's testing experience level and partition tag. During competition among candidate individuals, a candidate individual can only replace another candidate individual if both the candidate individuals have a common partition tag and are in the same competition group. A candidate individual cannot replace another candidate individual if they have different partition tags or are in different competition groups.

26 Claims, 9 Drawing Sheets

Related U.S. Application Data a continuation of application No. 14/595,991, filed on Jan. 13, 2015, now Pat. No. 10,268,953.

(60) Provisional application No. 62/534,622, filed on Jul. 19, 2017, provisional application No. 61/932,659, filed on Jan. 28, 2014.

(51) Int. Cl.
  *G06N 20/10* (2019.01)
  *G06N 7/02* (2006.01)

(56) References Cited

U.S. PATENT DOCUMENTS

| | | | |
|---|---|---|---|
| 6,240,399 B1 | 5/2001 | Frank et al. | |
| 6,249,783 B1 | 6/2001 | Crone et al. | |
| 7,013,344 B2 | 3/2006 | Megiddo | |
| 7,370,013 B1 | 5/2008 | Aziz et al. | |
| 7,444,309 B2 | 10/2008 | Branke et al. | |
| 8,527,433 B2 | 9/2013 | Hodjat et al. | |
| 8,909,570 B1 | 12/2014 | Hodjat et al. | |
| 8,918,349 B2 | 12/2014 | Hodjat et al. | |
| 8,977,581 B1 | 3/2015 | Hodjat et al. | |
| 9,002,759 B2 | 4/2015 | Hodjat et al. | |
| 9,466,023 B1 | 10/2016 | Shahrzad et al. | |
| 2001/0019844 A1 | 9/2001 | Kishkovich et al. | |
| 2002/0080169 A1 | 6/2002 | Diederiks | |
| 2004/0210545 A1 | 10/2004 | Branke et al. | |
| 2004/0254901 A1 | 12/2004 | Bonabeau et al. | |
| 2005/0033672 A1 | 2/2005 | Lasry et al. | |
| 2005/0187848 A1 | 8/2005 | Bonissone et al. | |
| 2005/0198103 A1 | 9/2005 | Ching | |
| 2007/0143198 A1 | 6/2007 | Brandes et al. | |
| 2007/0143759 A1 | 6/2007 | Ozgur et al. | |
| 2007/0185990 A1 | 8/2007 | Ono et al. | |
| 2008/0071588 A1 | 3/2008 | Eder | |
| 2008/0228644 A1 | 9/2008 | Birkestrand et al. | |
| 2009/0125370 A1 | 5/2009 | Blondeau et al. | |
| 2009/0307638 A1 | 12/2009 | McConaghy | |
| 2010/0030720 A1 | 2/2010 | Stephens | |
| 2010/0182935 A1 | 7/2010 | David | |
| 2010/0274736 A1* | 10/2010 | Hodjat | G06Q 40/04 705/36 R |
| 2010/0274742 A1 | 10/2010 | Hodjat et al. | |
| 2010/0293119 A1 | 11/2010 | Ferringer et al. | |
| 2011/0161264 A1 | 6/2011 | Cantin | |
| 2011/0246834 A1 | 10/2011 | Rajashekara et al. | |
| 2012/0016804 A1* | 1/2012 | Lin | G06Q 10/08 705/334 |
| 2012/0095611 A1* | 4/2012 | Yi-Kuei | H02J 3/00 700/297 |
| 2012/0239517 A1 | 9/2012 | Blondeau et al. | |
| 2013/0124440 A1 | 5/2013 | Hodjat et al. | |
| 2013/0254142 A1 | 9/2013 | Hodjat et al. | |
| 2014/0006316 A1 | 1/2014 | Hodjat et al. | |
| 2014/0258279 A1* | 9/2014 | Hayashi | G16B 50/00 707/723 |
| 2016/0283563 A1 | 9/2016 | Hodjat et al. | |
| 2017/0060963 A1 | 3/2017 | Whittaker et al. | |
| 2017/0323219 A1 | 11/2017 | Shahrzad et al. | |

FOREIGN PATENT DOCUMENTS

| | | |
|---|---|---|
| JP | H08-110804 | 4/1996 |
| JP | 2001325041 | 11/2001 |
| JP | 2003044665 | 2/2003 |
| JP | 2004240671 | 8/2004 |
| JP | 2004302741 | 10/2004 |
| JP | 2007207173 | 8/2007 |
| JP | 2007522547 | 8/2007 |
| WO | WO 2005/073854 | 8/2005 |
| WO | WO 2010/127039 | 11/2010 |
| WO | WO 2010/127042 | 11/2010 |

OTHER PUBLICATIONS

Lehman, Joel, et al., "Exploiting Open-Endedness to Solve Problems Through the Search for Novelty," ALIFE, 2008.

Hornby, "ALPS: The Age-Layered Population Structure for Reducing the Problem of Premature Convergence," GECCO '06, Seattle, WA, Jul. 2006, 8 pp.

Hornby, G.S., "A Steady-State Version of the Age-Layered Population Structure EA," Chapter 1 of Genetic Programming Theory and Practice VII, Riolo et al., editors, Springer 2009, 16 pp.

Hornby, G.S., "Steady-State ALPS for Real-Valued Problems," GECCO '09, Montreal, Jul. 2009, Assoc. for Computing Machinery, 8 pp.

Idesign lab, "ALPS—the Age-Layered Population Structure," UC Santa Cruz web article printed Mar. 17, 2011, 3 pp. (http://idesign.ucsc.edu/projects/alps.html).

U.S. Appl. No. 13/184,307, filed Jul. 15, 2011 entitled "Data Mining Technique with Experience-Layered Gene Pool," 47 pages.

Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.

Kosorukoff, "Using incremental evaluation and adaptive choice of operators in a genetic algorithm," Proc. Genetic and Evolutionary Computation Conference, GECCO—Sep. 2002, 7 pp.

Nelson, "Fitness functions in evolutionary robotics: A survey and analysis," Robotics and Autonomous Systems 57 (Apr. 30, 2009) 345-370.

Bongard, J. C. et al., "Guarding Against Premature Convergence while Accelerating Evolutionary Search", GECCO '10: Proceedings of the 12th annual conference on Genetic and Evolutionary Computation, 8 pages (2010).

Wu et al., "An incremental fitness function for partitioning parallel tasks," Proc. Genetic and Evolutionary Computation Conf. (Aug. 2001) 8 pp.

Whitehead, "Genetic Evolution of Radial Basis Function Coverage Using Orthogonal Niches," IEEE Transactions on Neural Networks, 7:6, (Nov. 1996) 1525-28.

Castillo Tapia M.G. et al., "Applications of multi-objective evolutionary algorithms in economics and finance: A survey," Proc. IEEE Congress on Evolutionary Computation, Sep. 2007, pp. 532-539.

Ducheyne, E. et al., "Is Fitness Inheritance Useful for Real-World Applications?" Evolutionary Multi-Criterion Optimization, ser. LNCS 2631, Spring 2003, pp. 31-42.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Juille, H. "Evolution of Non-Deterministic Incremental Algorithms as a New Approach for Search in State Spaces," Proc. 6th Int'l Conf. on Genetic Algorithms, 1995, 8 pp.

International Search Report dated Jul. 2, 2010 in PCT/US10/32847.

International Search Report dated Jun. 29, 2010 in PCT/US10/32841.

Sacks, J. et al. "Design and Analysis of Computer Experiments," Statistical Science 4:4, 1989, 409-435.

Torresen, J. "A Dynamic Fitness Function Applied to Improve the Generalisation when Evolving a Signal Processing Hardware Architecture," Proc. EvoWorkshops 2002, 267-299 (12 pp).

Bartlett II, J.E. et al., "Organizational Research: Determining Appropriate Sample Size in Survey Research," IT, Learning, and Performance Journal 19(1) Spring 2001, 8 pp.

Fitzpatrick, J.M. et al., "Genetic Algorithms in Noisy Environments," Machine Learning 3: 101-120, May 1988.

JP 2010-533295, Office Action dated Apr. 16, 2013, English language translation, 3 pages.

Koza, J.R., "Genetic Programming: On the Programming of Computers by Means of Natural Selection", Dec. 1992, MIT Press, pp. 1-609.

León C. et al., "Parallel hypervolume-guided hyperheuristic for adapting the multiobjective evolutionary island model," Proc. 3rd

(56) References Cited

OTHER PUBLICATIONS

Int'l Workshop on Nature Inspired Cooperative Strategies for Optimization Studies in Computational Intelligence, vol. 236, Nov. 2008, pp. 261-272.
López Jaimes A. et al., "MRMOGA: Parallel evolutionary multi objective optimization using multiple resolutions," Proc. IEEE Congress on Evolutionary Computation, vol. 3, Sep. 2005, pp. 2294-2301.
Davarynejad et al., "A Novel General Framework for Evolutionary Optimization: Adaptive Fuzzy Fitness Granulation," CEC Sep. 2007, 6 pp.
Davarynejad, M. "Fuzzy Fitness Granulation in Evolutionary Algorithms for complex optimization," Master of Science Thesis, Ferdowsi Univ. of Mashhad, Jun. 2007, 30 pp.
Salami, M. et al., "A fast evaluation strategy for evolutionary algorithms," Applied Soft Computing 2/3F (Jan. 2003) 156-173.
Poli R et al., "Genetic Programming: An introductory Tutorial and a Survey of Techniques and Applications," Technical Report No. CES-475, ISSN: 1744-8050, Oct. 2007, 112 pp.
Georgilakis, P.S. "Genetic Algorithm Model for Profit Maximization of Generating Companies in Deregulated Electricity Markets," Applied Artificial Intelligence, Jul. 2009, 23:6,538-552.
Refafitzadeh, P. et al., "Cross Validation" entry, Encyclopedia of Database Systems, eds. Özsu and Liu, Springer, 2009, 6 pp.
Remde, S. et al. "Evolution of Fitness Functions to Improve Heuristic Performance," LION Dec. 8-10, 2007 II, LNCS 5313 pp. 206-219.
Sakauchi et al., "UNIFINE: A Next Generation Financial Solution System of Nihon Unisys Ltd.," Technology Review 'UNISYS,' Japan, Nihon Unisys Ltd., Feb. 28, 2006, vol. 25, No. 4, pp. 14-15.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.
Streichert, "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL:http://www.ra.cs.uni-tuebingen.de/mita rb/streiche/publications/Introduction to E volutionary Algorithms.pdf).
Tanev I et al., "Scalable architecture for parallel distributed implementation of genetic programming on network of workstations," J. Systems Architecture, vol. 47, Jul. 2001, pp. 557-572.
U.S. Appl. No. 13/184,307—Office Action dated Oct. 21, 2013, 16 pages.
Homby, Gregory S.,"The Age-Layered Population Structure (ALPS) Evolutionary Algorithm," ACM; GECCO '09, Jul. 8-12, 2009; 7 pages.
U.S. Appl. No. 13/358,381—Office Action dated Jul. 8, 2014, 30 pages.
Freitas, A., "A review of evolutionary algorithms for data mining," Soft Computing for Knowledge Discovery and Data Mining, Springer US, 2008, pp. 79-111.
U.S. Appl. No. 13/540,507—Office Action dated Sep. 9, 2014, 25 pages.
U.S. Appl. No. 13/184,307—Notice of Allowance dated Aug. 4, 2014, 9 pages.
U.S. Appl. No. 13/184,307—Office Action dated Mar. 21, 2014, 36 pages.
Laumanns et al., "A Unified Model for Multi-Objective Evolutionary Algorithms with Elitism"; 2000; IEEE; pp. 46-53.
U.S. Appl. No. 13/540,507—Notice of Allowance, dated Oct. 31, 2014, 9 pages.
US 13/358,381—Notice of Allowance, dated Nov. 19, 2014, 5 pages.
Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.
U.S. Appl. No. 14/595,991—Office Action dated May 10, 2017, 32 pages.
Ahn et al., "Elitism-Based Compact Genetic Algorithms"; 2003; IEEE; Transactions on Evolutionary Computation, vol. 7, No. 4; pp. 367-385.
Akbarzadeh et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.
Bui, L.T. et al., "Local models: An approach to distributed multi-objective optimization," Computational Optimization and Applications, vol. 42, No. 1, Jan. 2009, pp. 105-139.
Hodjat et. al., "nPool: Massively Distributed Simultaneous Evolution and Cross-Validation in EC-Star," Sentient Technologies, May 2015, pp. 1-12.
Myers, Raymond H. and Montgomery, Douglas C., Response Surface Methodology: Process and Product Optimization Using Designed Experiments, John Wiley and Sons, Inc., New York, 1995, 12 pages.
Al-Haj Baddar, "Finding Better Sorting Networks," Dissertation to Kent State University for PhD, May 2009, 86 pages.
Cuccu, G., et al., "When Novelty is Not Enough," vol. 6624 in Lecture Notes in Computer Science, published in Applications of Evolutionary Computation, Springer-Verlag Berlin Heidelberg, Copyright 2011, pp. 234-243.
Gomes et al., "Devising Effective Novelty Search Algorithms: A Comprehensive Empirical Study," GECCO '15, Madrid, Spain, Jul. 11-15, 2015, ACM (Copyright 2015), 8 pages.
Gomes et al., "Evolution of Swarm Robotics Systems with Novelty Search," published in Swarm Intelligence, vol. 7, Issue 2, ANTS Special Issue, 2013, pp. 115-144.
Gomes et al., "Progressive Minimal Criteria Novelty Search," Lisboa, Portugal, cited in Advances in Artificial Intelligence, Springer-Verlag Berlin Heidelberg, Copyright 2012, pp. 281-290.
Gupta et al., "An Overview of methods maintaining Diversity in Generic Algorithms," International Journal of Emerging Technology and Advanced Engineering, vol. 2, Issue 5, May 2012, pp. 56-60.
Hodjat et al, "Maintenance of a Long Running Distributed Genetic Programming System for Solving Problems Requiring Big Data," Genetic Finance Chap 1, published in Genetic Programming Theory and Practice XI as Chapter 4, 2014, 20 pages.
Kipfer et al., "UberFlow: A GPU-Based Particle Engine," Computer Graphics and Visualization, The Eurographics Association, Copyright 2004, 9 pages.
Krcah et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.
Lehman et al., "Abandoning Objectives: Evolution through the Search for Novelty Alone," Evolutionary Computation journal, (19):2, MIT Press, Copyright 2011, pp. 189-223.
Lehman et al., "Efficiently Evolving Programs through the Search for Novelty," Proceedings of the Genetic and Evolutionary Computation Conference, ACM, New York NY, Copyright 2010, 8 pages.
Lehman et al., "Evolving a Diversity of Creatures through Novelty Search and Local Competition," Proceedings of the Genetic and Evolutionary Computation Conference, ACM, New York, NY, 2011, 8 pages.
Lehman et al., "Extinction Events Can Accelerate Evolution," PLOS ONE, journal.pone.0132886, Aug. 12, 2015, 16 pages.
Lehman et al., "Overcoming Deception in Evolution of Cognitive Behaviors," University of Texas at Austin, ACM, Jul. 12-16, 2014, 8 pages.
Lehman et al., "Revising the Evolutionary Computation Abstraction: Minimal Criteria Novelty Search," Proceedings of the Genetic and Evolutionary Computation Conference, GECCO 2010, ACM, 2010, 8 pages.
Mouret et al., "Encouraging Behavioral Diversity in Evolutionary Robotics: An Empirical Study," Massachusetts Institute of Technology, Copyright 2012, Evolutionary Computation 20(1), Spring, 2012, pp. 91-133.

(56) References Cited

OTHER PUBLICATIONS

Oreilly, U., et al., "EC-Star: A Massive-Scale, HUB and Spoke, Distributed Genetic Programming System," Evolutionary Design and Optimization Group, published in Genetic Programming Theory and Practice X as Chapter 6, published in V as Chap 1, Springer New York, Copyright 2013, 13 pages.
Salge, C., et al., "Empowerment—An Introduction," published in Guided Self-Organization: Inception, Chap 4, University of Hertfordshire, Copyright 2013, pp. 67-114.
Secretan, J., et al., "Piebreeder: A Case Study in Collaborative Evolutionary Exploration of Design Space," Evolutionary Computation journal, MIT Press, Copyright 2011, 30 pages.
Shahrzad, H., et al., "Tackling the Boolean Multiplexer Function Using a Highly Distributed Genetic Programming System," published in Genetic Programming Theory and Practice XII, Springer International Publishing, Copyright 2015, pp. 167-179.
Valsalam, V.K., et al., "Using Symmetry and Evolutionary Search to Minimize Sorting Networks," Journal of Machine Learning Research 14, The University of Texas at Austin, Department of Computer Science, 2013, pp. 303-331.
Wissner-Gross, et al., "Causal Entropic Forces," Physical Review Letters, PRL 110, 168702, American Physical Society, Apr. 19, 2013, 5 pages.
U.S. Appl. No. 14/595,991—Response to Office Action dated May 10, 2017, filed Nov. 10, 2017, 29 pages.
U.S. Appl. No. 14/595,991—Final Office Action dated Feb. 27, 2018, 25 pages.
U.S. Appl. No. 14/595,991—Response to Final Office Action dated Feb. 27, 2018, filed Jul. 27, 2018, 38 pages.
U.S. Appl. No. 14/595,991—Response to Final Office Action dated Feb. 27, 2018, filed May 22, 2018, 32 pages.
Stanley et al., Why greatness cannot be planned: the myth of the objective, New York, NY, Springer (2015).

* cited by examiner

TRAINING AND CONTROL SYSTEM FOR EVOLVING SOLUTIONS TO DATA-INTENSIVE PROBLEMS USING NESTED EXPERIENCE-LAYERED INDIVIDUAL POOL

CROSS-REFERENCE TO OTHER APPLICATIONS

This application claims priority to U.S. Provisional Patent Application No. 62/534,622, entitled "DATA MINING TECHNIQUE WITH NESTED EXPERIENCE-LAYERED INDIVIDUAL POOL," filed on Jul. 19, 2017, which is incorporated herein by reference.

This application is a Continuation-In-Part of U.S. Non-provisional patent application Ser. No. 14/595,991, filed Jan. 13, 2015, entitled "DATA MINING TECHNIQUE WITH MAINTENANCE OF ANCESTRY COUNTS", which application claims the benefit of U.S. Provisional Patent Application No. 61/932,659, filed Jan. 28, 2014, entitled "DATA MINING TECHNIQUE WITH MAINTENANCE OF ANCESTRY COUNTS", and U.S. Non-provisional patent application Ser. No. 15/146,846, filed May 4, 2016, entitled "DATA MINING TECHNIQUE WITH DISTRIBUTED NOVELTY SEARCH". Each of the above applications are incorporated herein by reference for their teachings.

FIELD OF THE INVENTION

The invention generally relates to a method and apparatus for finding solutions to various kinds of problems for better control of a target system, and more particularly, to an improved architecture and method for using evolutionary algorithms to find such solutions and for controlling the target systems.

BACKGROUND

Certain kinds of systems are designed to be controlled by an algorithm or another set of rules, which are hoped will control the system optimally. For example for an automatic power saver on a light switch which turns off a fluorescent light after a certain delay period after failing to sense activity in the room, there is an optimal delay period which is not too long (which would light an empty room) but not too short (because if someone enters the room shortly thereafter then energy would be wasted to re-start the light). For an engine to reach a target speed as quickly as possible, it is possible to accelerate it too quickly, thereby overshooting the target and wasting time. For a robot being controlled to cross a room quickly, an algorithm can be developed which controls the robot to turn left or right in response to detecting obstacles. All of these systems and many more require an algorithm or set of rules to control them in order to optimally meet desired goals. For some of the problems, such as optimally controlling acceleration rate of an engine, the algorithm or rule can be determined intuitively or from known principles. For other types of problems, such as the fluorescent light turn-off delay or the algorithm for operating the robot, the optimal solution may not be obvious. For many of the latter kinds of problems, data science can be used to try to infer an optimal algorithm by analysis of a large amount of data. For the fluorescent light turn-off delay example, data might be collected on how often and for how long the room is empty on different days of the week at different times of the day, and these data can be used to infer an optimal set of rules. For the robot example, a large number of possible algorithms might be tried, with data being collected on how quickly each algorithm causes the robot to reach the far side of the room.

Large data sets can be used to help find solutions to problems in many different environments. For example, a healthcare environment may record clinical data, diagnoses and treatment regimens for a large number of patients, as well as outcomes, and these data can be used to develop an algorithm to predict clinical conditions or optimize treatment for any particular future patient. A business environment may record customer information such as who they are and what they do, and their browsing and purchasing histories, and these data can be used to develop an algorithm to predict an arbitrary customer's future behavior, or to target specific customers with relevant ads. A computer security environment may record a large number of software code examples that have been found to be malicious, and these data can be used to develop an algorithm to detect malicious code in incoming data packets. There are many techniques for developing algorithms or rules based on very large data sets. These include for example support vector machines, regression analysis, neural networks, sequential minimal optimization, space mapping, and many others. The present discussion addresses specifically evolutionary techniques, such as genetic algorithms. Evolutionary algorithms, which are supersets of Genetic Algorithms, are good at traversing chaotic search spaces. According to Koza, J. R., "Genetic Programming: On the Programming of Computers by Means of Natural Selection," MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules among the fittest parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. In one of a number of solutions to this problem, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool).

When using genetic algorithms against a large database to find solutions to a problem, it may not be practical to test each individual against the entire database. The system therefore rarely if ever knows the true fitness of any individual. Rather, it knows only an estimate of the true fitness, based on the particular subset of data samples on which it has actually been tested. The fitness estimate itself, therefore, varies over time as the individual is tested on an increasing number of samples. It is in this kind of environment that embodiments of the present invention reside.

In a data mining environment with multiple solution landscapes, the evolutionary data mining system might generate some stepping stone individuals. Stepping stone individuals are individuals that do not necessarily have a high fitness estimate, but can have one or more critical parts of a future optimal individual. Despite their potential value, there is always a risk that before the stepping stone individual can be effectively utilized during procreation to create better individuals, they may get displaced by some other individuals that do not have the stepping stone individuals' critical parts but have marginally better fitness estimate. Considering only the fitness estimates of individuals during the evolution cannot ensure a diverse set of patterns or emergence of new patterns.

For example, in a healthcare embodiment, an individual diagnosing low blood pressure will have a lower fitness score than individuals diagnosing high blood pressure when tested on a subset of high blood pressure data samples. Therefore, if high blood pressure data samples are used for testing early in the testing process, there is a possibility that the competition module may prematurely discard the individual diagnosing low blood pressure from the candidate individual pool based on its low fitness score. The discarding of the latter individual could result in a loss of a solution, or part of a solution, thereby impeding progress toward a solution that is optimal.

SUMMARY

A data mining system is introduced herein that promotes individual diversity by not discarding individuals based only on their fitness estimates. It is in this kind of environment that embodiments of the present invention reside.

Roughly described, a computer-implemented evolutionary data mining system includes a memory storing a pool of candidate individuals in which each candidate individual has a respective fitness estimate, a respective testing experience level, and a respective value for a partition tag. The data mining system further includes a processing unit which tests individuals from the candidate individual pool on training data, updates the fitness estimate associated with the tested individuals in dependence upon the tests, and assigns each candidate individual in the candidate individual pool into one of a plurality of competition groups in dependence upon said the candidate individual's testing experience level and partition tag value. A competition module selects individuals for discarding from the candidate individual pool in dependence upon their assigned competition group. Preferably the candidate individual pool has an elitist pool containing multiple experience layers, where individuals in each experience layer are further categorized into various competition groups in accordance to their partition tag. The competition module causes individuals to compete only with other individuals in the same experience layer and in the same competition group with similar partition tags.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification, and drawings.

BRIEF DESCRIPTION OF THE DRAWINGS

The invention will be described with respect to specific embodiments thereof, and reference will be made to the drawings, in which.

DETAILED DESCRIPTION

Figure 1:
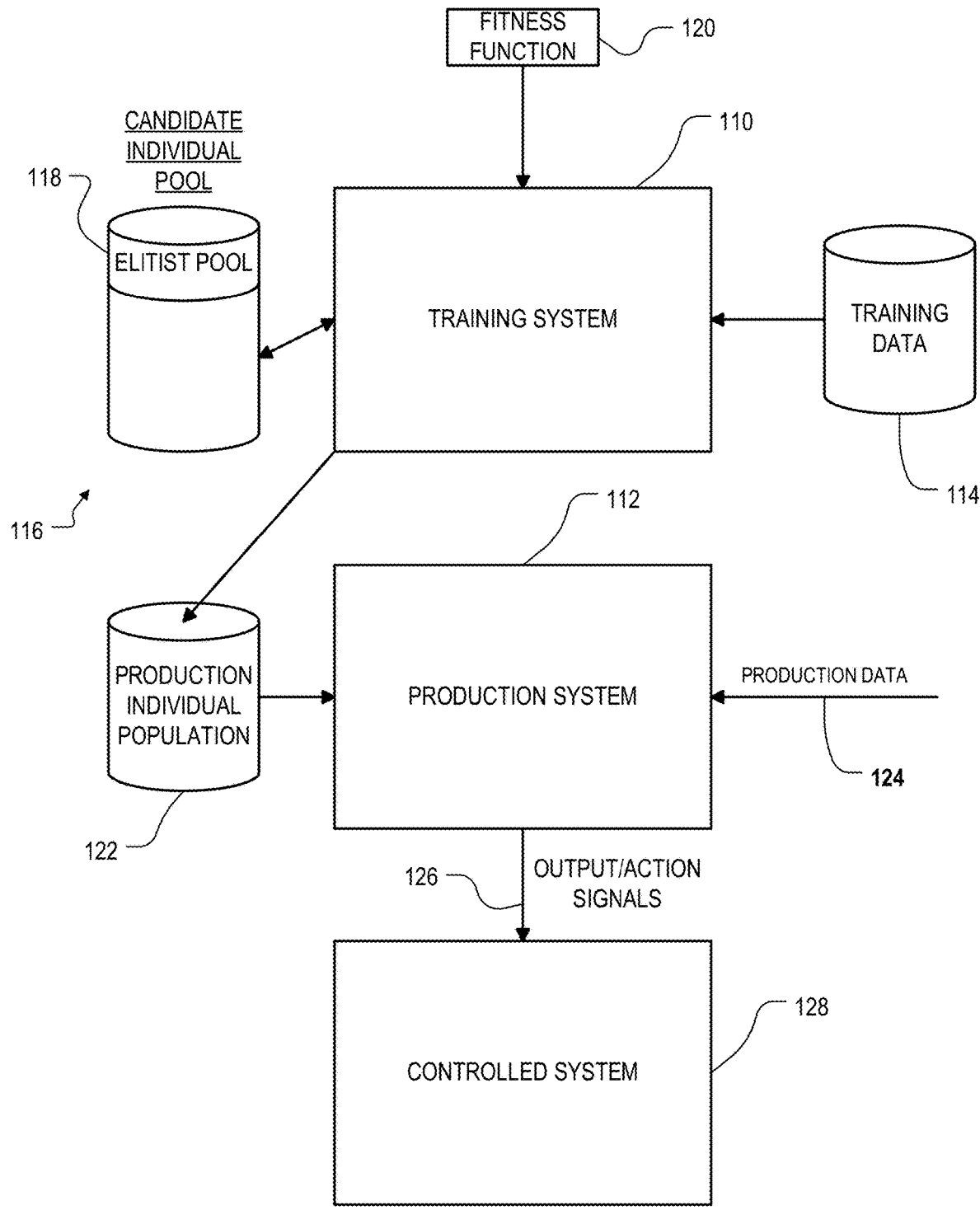
FIG. 1 is an overall diagram of an embodiment of a data mining system incorporating features of the invention.

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

In the above-incorporated "DATA MINING TECHNIQUE WITH EXPERIENCE-LAYERED GENE POOL" application, a computer-implemented evolutionary data mining system includes a memory storing a candidate gene/individual database in which each candidate individual has a respective fitness estimate; a gene/individual pool processor which tests individuals from the candidate individual pool on training data and updates the fitness estimate associated with the individuals in dependence upon the tests; and a gene/individual harvesting module providing for deployment selected ones of the individuals from the candidate individual pool, wherein the individual pool processor includes a competition module which selects individuals for discarding from the candidate individual pool in dependence upon both their updated fitness estimate and their testing experience level. For simplicity of discussion, no distinction is made herein between a 'gene' and an 'individual,' and the two terms are used interchangeably herein. An individual's experience is a measure of the number of times that the individual has been tested. Preferably the candidate individual database has an elitist pool containing multiple experience layers, where each experience layer comprises of individuals with a certain range of experience. The competition module causes individuals to compete only with other individuals in their same experience layer based on the individual's fitness scores.

In general, in embodiments herein, the elitist pool contains T experience layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed experience layer 0 ($L_0$). Each i'th one of the experience layers in [$L_0$ ... $L_{T-1}$] contains only individuals with a respective range of testing experience [ExpMin($L^i$) ... ExpMax($L_i$)], each ExpMin($L_{i+1}$)>ExpMax($L_i$). The minimum experience level of the bottom experience layer $L_0$ is 0, and the top experience layer $L_T$ has a minimum experience level ExpMin($L_T$) but no maximum experience level. Preferably, the experience ranges of contiguous layers are themselves contiguous, so that ExpMin($L_{i-1}$)=ExpMax($L_i$)+1, for 0<=i<T. Note that testing experience level is a significantly different basis on which to stratify individuals in an elitist pool than age in the sense of Age-Layered Population Structure (ALPS).

Considering only the fitness scores and experience levels of individuals during the evolution cannot ensure a diverse set of patterns or emergence of new patterns. In a data mining environment with multiple solution landscapes, there is always a risk that early on, the evolutionary data mining system might generate some stepping stone individuals. Before the stepping stone individual can be effectively utilized during procreation to create better individuals, they may get displaced by some other individuals that do not have the stepping stone individuals' critical parts but have marginally better fitness score.

Early elimination of stepping stone individuals can be reduced, and more diversity in discerning patterns by individuals can be encouraged, in an evolutionary data mining system if individuals in an experience layer in the candidate individual database can be further categorized or tagged by a second property of the individuals other than experience (i.e., an individual's testing experience is the first property used for the first level of categorization of individuals in the candidate individual pool as described in the previous paragraphs). A "property" of an individual is saved in the candidate individual pool in association with the individual and has a numerical value. The second level of categorization can act as nested competition groups inside each experience layer. With the nested grouping by partition tags system in the candidate individual pool, the competition module may select individuals for discarding in dependence on their fitness estimate, their testing experience level, and their secondary categorization or partition tag. An individual can only replace another individual if both individuals have a common partition tag and are in the same competition group. An individual cannot replace another individual if they have different partition tags or are in different competition groups.

For example, in a healthcare embodiment, the individuals diagnosing low blood pressure can have a "low blood pressure" partition tag while the individuals diagnosing high blood pressure can have a "high blood pressure" partition tag. Therefore, when both sets of individuals are being tested on a subset of high blood pressure data samples, individuals with "low blood pressure" partition tag will not be prematurely discarded, even though they have a lower fitness score than individuals with a "high blood pressure" partition tag. With the nested competition grouping in the experience layers, the evolutionary data mining system has access to a more diverse set of individuals and a greater survival rate for stepping stones individuals.

The second property that defines the partition tag of the individuals in the candidate individual pool is chosen in such a way by the system designer so that the evolution process benefits from individuals competing based on fitness scores only with individuals in the same competition group of the same experience layer. In one embodiment, a competition group can represent a partition tag of a certain value. In another embodiment, the competition groups' partition tag can be a range of value. In another embodiment, the competition groups' partition tag can be a fuzzy logic value where the truth values of variables may be any real number within a predetermined range, such as the range of 0 to 1 (e.g., 0.1, 0.2. 0.3, etc.) instead of being constrained to values of the integer values 0 or 1.

In one embodiment, the partition tag can be the ancestry count. "Ancestry count" is an indication of the number of procreation events that occurred in the procreation history of a particular new individual. It can be calculated by a number of different formulas. In one embodiment, each new individual formed by procreation is assigned an ancestor count equal to one plus the maximum ancestor count of its parent individual(s). A new individual created randomly is assigned an ancestor count of zero.

Using the ancestry count as the partition tag can have a great advantage in a number of ways. For example, because individuals with a higher ancestry count are more evolved, these individuals are expected to perform better than those created randomly. By using the ancestry count of the individuals as the partition tag, an individual can only replace another individual only if their ancestry count is the same (or, in an embodiment, only if both ancestry counts are within a predetermined range of ancestry counts). An individual with lower ancestry count and higher fitness score will not be able to replace a more evolved individual with higher ancestry count and lower fitness score. Likewise, a new, randomly created individual with an ancestry count of zero will not be replaced by a more evolved individual with higher ancestry count.

In one embodiment, the problem statement of the data mining system includes a plurality of sub-problems, and the partition tag identifies with one of the sub-problems addressed by the candidate individual. The sub-problem can be based on the genotypic properties of the individuals (properties related to the individuals). For example, in a healthcare embodiment, individuals that test whether a patient's blood pressure is above or below a certain threshold can have the partition tag "blood pressure." Individuals that check whether a patient's body temperature is above or below a certain threshold can have the partition tag "temperature."

In one embodiment, the sub-problem can be based on the phenotypic properties of the individuals (properties related to the behavior of the individuals). In a healthcare embodiment, a patient's future state can be predicted by the given patient's current state and past state. If the patient has a high pulse rate, high blood pressure and is experiencing chest pain, the patient can have a cardiac arrest in the near future. Individuals that predict the possibility of a patient having a cardiac arrest in the near future can have a phenotypic "cardiac arrest" partition tag.

Assignment of genotypic and phenotypic partition tags to individuals is done by the system designer. In one embodiment, the system designer may choose to create new genotypic and phenotypic individual partition tags during procreation.

In one embodiment, the partition tag of the individuals can be based on the diversity measure of the individuals. That is, the evolutionary data mining system rewards new individuals which are significantly different from individuals already in the candidate individual pool. There are many potential ways to measure diversity by analyzing and quantifying individual behaviors to characterize their differences. Importantly, like the fitness function, this diversity measure must be fitted to the domain. The diversity measure can be calculated by a number of different formulas. In one embodiment, the diversity measure of a newly-procreated individual is computed with respect to the behaviors of individuals in the candidate individual pool. The aim is to characterize how far away the new individual is from the rest of the population and its predecessors in behavior space. By using the diversity measure of the individuals as the partition tag, an individual which is significantly different from individuals already in the candidate individual pool will not be easily eliminated.

In an embodiment, when individuals from the candidate individual pool are tested against a portion of the training data, a behavioral value of the individual is identified. As used herein, a "behavioral value" $b(x)$ of an individual x in a data mining environment is a vector or a scalar number resulting from the evaluation of the individual in the data mining environment, according to a predefined measure of its behavior. For examples, for a robot navigating a maze, the predetermined measure of the robot's behavior of the robot may be a history of how the robot solves the task to get to its final destination, rather than the speed at which it reaches the final destination. In other words, the predetermined measure of the behavior of an individual captures a space that is expected to have practical benefits. The diversity measure of an individual can be estimated by averaging the pairwise distance of the individual's behavior vector to that of all the other individuals in the candidate individual pool. More details about estimating diversity measures can be found in the U.S. Non-provisional patent application Ser. No. 15/146,846 which is incorporated herein by reference.

In general, in embodiments herein, each experience layer contains N competition groups numbered $T_1$-$T_N$, with N>=1. In one embodiment, grouping by partition tags is available for experience layers in the elitist pool. In another embodiment, grouping by partition tags can be available in every experience layer in the candidate individual database. In one embodiment, each i'th one of the competition groups in [$T_1$ . . . $T_N$] is associated with one partition tag. In one embodiment, each i'th one of the competition groups in [$T_1$ . . . $T_N$] is associated with one or more partition tags.

In embodiments herein, each competition group Tj (i.e., in competition groups [$T_1$ . . . $T_N$]) in each experience layer Li in the elitist pool (i.e., in experience layers [$L_1$ . . . $L_T$]) is permitted to hold a respective maximum number of individuals, Quota($L_i$, $T_j$). The quota is chosen to be small enough to ensure competition among the individuals within the corresponding range of experience levels and with the same partition tag. Preferably the quota of each such group is fixed, but it could vary in another embodiment. The quota of the competition groups in experience layer $L_0$ is not chosen based on these criteria since the individuals in experience layer $L_0$ do not yet compete. In one embodiment, there is no competition group in experience layer $L_0$.

In embodiments where ancestry count is used as the partition tag, the quota for each competition group can be the same or follow a kind of pyramid scheme to allow retaining a larger number of evolved individuals (inverse pyramid scheme) and fewer new individuals or vice versa.

In embodiments where diversity measure is used as the partition tag, the quota for each competition groups can be the same or follow a kind of pyramid scheme to give more premium to individuals with higher diversity measure or vice versa.

As each individual gains more experience, assuming it is not displaced within its current competition group in their current experience layer, it will eventually graduate to the competition group associated with the same partition tag in the next higher experience layer. If the competition group associated with the partition tag in the next higher experience layer is not present, then evolutionary data mining system will create a new competition group associated with the partition tag, and the individual is added to that newly-created competition group. If the competition group associated with the partition tag in the next higher experience layer is present and not yet full, then the individual is added to that competition group. If it is full, then the individual has to compete for its place in the competition group in the higher experience layer. If it is fitter than the least fit individual in that competition group in the higher experience layer, it will be accepted into that competition group, and the least fit individual in the competition group will be discarded. If not, then the graduating individual will be discarded, and the individuals in the competition group in the next higher experience layer will be retained. A "least fit" individual of a competition group has the lowest fitness estimates among all the individuals in the competition group.

Either way, a space is opened in the current competition group in the current experience layer (the layer from which the individual is graduating). The open space means that the next individual with similar partition tag graduating into the current competition group in the current experience layer from below will be accepted without having to compete for its place—thereby defeating a purpose of the elitist pool. To mitigate this problem, an embodiment introduces the concept of a minimum fitness for each partition tag available in the evolutionary data mining system, which in one embodiment is set to the minimum fitnesses of the corresponding competition groups in the top experience layer $L_T$. The individuals in the top layer are assumed to have a relatively accurate estimate of their fitness, and since after the competition groups in the top experience layer $L_T$ are full, the goal of the evolutionary algorithm is to identify individuals that are better than the ones already there, it makes sense to avoid devoting resources to individuals which already appear to be inferior. Thus in the embodiment, once the minimum fitnesses for each partition tag in the elitist pool minimum fitness is set, any individual being considered into the elitist pool can only be added if it has a fitness value above the partition tag's elitist pool minimum fitness. Stated differently, once the competition groups in the top experience layer $L_T$ is full, individuals with partition tags j are not allowed to enter a competition group in experience layer $L_1$ unless their fitness level is at least as high as the minimum fitness FitMin($L_T$, $T_j$) of the competition group $T_j$ of the top experience layer $L_T$.

In an embodiment, the elitist pool competition group minimum fitness is not established until the top layer is full. Otherwise, if the earliest entrants into the top layer happen to have excellent fitness, they will block other entrants which might be needed for diversity.

It will be appreciated that since the fitness estimate of individuals is still somewhat uncertain at the time they are being considered for entry into a competition group $T_j$ in the elitist pool from $L_0$, establishing the minimum entry fitness at exactly FitMin($L_T$, $T_j$) may cull individuals that eventually would have been determined to have an actual fitness which exceeds FitMin($L_T$, $T_j$). In another embodiment, therefore, the minimum fitness for entry into a competition group $T_j$ in the elitist pool is set at some other fitness level which is a function of FitMin($L_T$, $T_j$). For example, it can be set at 90% of FitMin($L_T$, $T_j$). It will also be appreciated that the accuracy of an individual's fitness estimate improves as the individual progresses up through the experience layers. Another embodiment, therefore, reduces the potential inaccuracy of the elitist pool competition group minimum fitness test by applying it at the entry to one of the higher layers in the elitist pool, rather than at $L_0$. In yet another embodiment, the test is applied more than once, at the entry to more than one of the layers, or all of them. Other variations will be apparent. In general, in embodiments which attempt to cull unfit individuals early, individuals are discarded at the entry to at least one of the competition groups in the elitist pool, if their fitness estimate at that time is less than some function f( ) that depends at least on FitMin($L_T$, $T_j$). Note that the function f( ) need not necessarily be the same for all the layers at which the rule is applied.

Individuals that enter the competition groups in the top experience layer may themselves undergo further testing on samples in the training database. With such further experience, the fitness estimate of even those individuals may change. This can introduce a wave effect in the competition group in the top experience layer due to fluctuations in fitness estimates of the individual with minimum fitness. This will, in turn, affect the elitist pool competition group minimum fitness if the top layer is at quota. If the fitness estimate of the individual with the minimum fitness in the competition group in the top experience layer decreases, then the minimum fitness of the competition group in the top experience layer (and hence the entire elitist pool minimum fitness) will decrease. In order to prevent this, in one embodiment, individuals that have reached the competition groups in the top experience layer do not undergo further testing. The justification here is that individuals in the competition groups in the top experience layer are assumed to already have fitness estimates which are as representative as possible to their actual fitness. Such an embodiment accepts any remaining error in the fitness estimate because the likelihood that purely random variations at that point would exceed an error range already considered acceptable, is too large.

In one embodiment, individuals are harvested from the entire elitist pool for use against production data. In another embodiment, only individuals that have reached the top experience layer are subject to harvesting. In either embodiment, further selection criteria can be applied in the harvesting process. In some embodiments, the partition tag of the individuals is used to weight the likelihood that an individual is selected for use against production data. For example, in embodiments where ancestry count is used as the partition tag, individuals having more than a threshold ancestry count might be weighted so as to increase or decrease the likelihood that they will be selected in this step. More generally, a weight can be applied to the random selection of the parent individuals based on the parent individual's partition tags.

Example Embodiment

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate individual pool. As used herein, the term "database" does not necessarily imply any unity of structure. For example, two or more separate databases, when considered together, still constitute a "database" as that term is used herein. The candidate individual pool database 116 includes a portion 118 containing the elitist pool. The training system 110 operates according to a fitness function 120, which indicates to the training system 110 how to measure the fitness of an individual. The training system 110 optimizes for individuals that have the greatest fitness where fitness is defined by the fitness function 120. The fitness function is specific to the environment and the goals of the particular application. For example, the fitness function may be a function of the predictive value of the individual as assessed against the training data—the more often the individual correctly predicts the result represented in the training data, the more fit the individual is considered. In the healthcare domain, an individual might propose a diagnosis based on patient prior treatment and current vital signs, and fitness may be measured by the accuracy of that diagnosis as represented in the training data.

The production system 112 operates according to a production individual population in another database 122. The production system 112 applies these individuals to production data 124, and produces outputs 126, which may be action signals or recommendations. In the healthcare domain, for example, the production data 124 may be current, real-time or near-real-time patient data, and the outputs 126 of the production system 112 may be a suggested diagnosis or treatment regimen that one or more of the individuals in production individual population 122 outputs in response to the production data 124. The production individual population 122 is harvested from the training system 110 once or at intervals, depending on the embodiment. Preferably, only individuals from elitist pool 118 are permitted to be harvested. In an embodiment, further selection criteria are applied in the harvesting process. Such further selection criteria may, for example, involve reference to the fitness trial histories of the individuals in the pool, and/or ancestry count.

The controlled system 128 is a system that is controlled automatically by the signals 126 from the production system. Depending on the application environment, the controlled system 128 may include for example computer systems, mechanical systems such as engines, air-conditioners, refrigerators, electric motors, robots, milling equipment, construction equipment, or a manufacturing plant.

Figure 2:
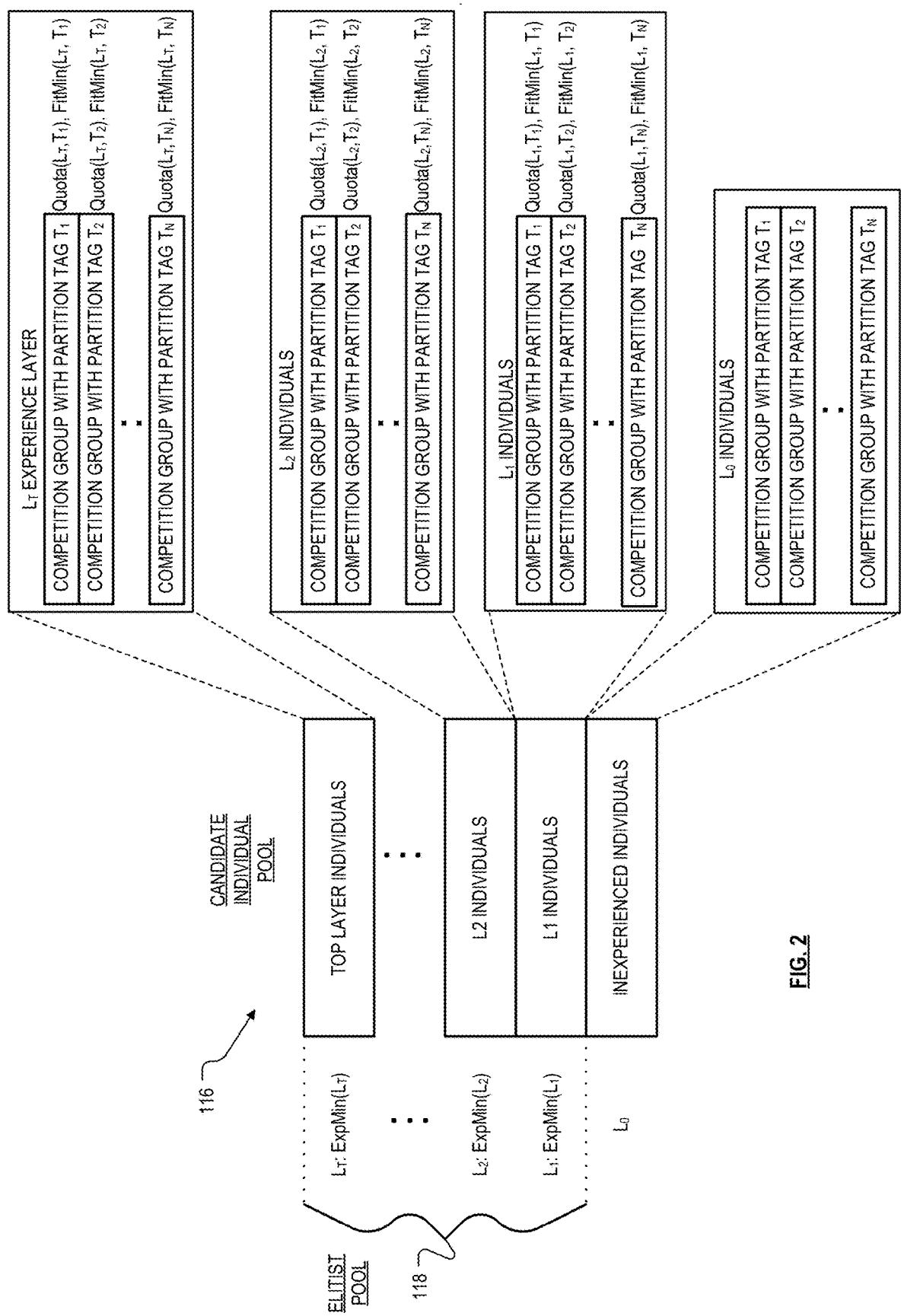
FIG. 2 is a symbolic drawing of the candidate individual pool in FIG. 1 with nested competition groups, according to an embodiment of the invention.

FIG. 2 is a symbolic drawing of the candidate individual pool 116 in FIG. 1. An "experience layered" elitist pool is used in the present embodiment, though aspects of the invention can be used in embodiments without experience layers, and indeed without an elitist pool. As can be seen in FIG. 2, the individuals in the pool are stratified into T+1 "experience layers," labeled $L_0$ through $L_T$. The individuals in $L_0$ are very inexperienced (have been tested on only a relatively small number of samples in training data 114, if any), whereas the higher layers contain individuals in successively greater experience ranges. The experience layers $L_1$ through $L_T$ constitute the elitist pool 118 (FIG. 1). Each experience layer $L_i$ in the elitist pool 118 has associated therewith a range of experience levels [ExpMin($L_i$) . . . ExpMax($L_i$)] for the layer. For example, an embodiment may have on the order of 40 or 50 layers in the elitist pool, each containing individuals with experience levels within a range on the order of 4000-5000 trials. The minimum experience level ExpMin($L_1$) may be on the order of 8000-10,000 trials.

In the embodiment of FIG. 2, ExpMin($L_0$)=0. Also, as the experience ranges of the experience layers are contiguous, ExpMin of each experience layer can be inferred as one higher than ExpMax of the next lower experience layer, or ExpMax of each experience layer can be inferred as one lower than ExpMin of the next higher experience layer. Thus only the minimum experience level or the maximum experience level need be specified for each layer. In the embodiment, only the minimum experience levels are specified, and they are specified for layers $L_1$-$L_T$; in another embodiment, only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder is calculated algorithmically as needed. Other variations will be apparent.

Referring to FIG. 2, individuals in each experience layer are further arranged into N nested "competition groups" in accordance to their partition tags 1 through N, labeled $T_1$ through $T_N$. Individuals in a competition group in an experience layer will have the same partition tag. Individuals in a competition group in an experience layer will share the same experience level as the individuals in the other competition groups in the experience layer. Each competition group $T_j$ in each experience layer $L_i$ has associated therewith two competition group parameters: a quota Quota($L_i$, $T_j$) for the competition group $T_j$ in experience layer $L_i$ and the minimum fitness FitMin($L_i$, $T_j$) for the competition group $T_j$ in experience layer $L_i$. In the embodiment of FIG. 2, the quotas for all the competition groups in candidate individual pool are equal and fixed. Neither is required in other embodiments.

The FitMin( ) values in FIG. 2 are not specified a priori. Rather, they are filled by copying from the fitness estimate associated with the least fit individual in each competition group in each experience layer. Whenever the fitness estimate of the least fit individual in a competition group is updated, and whenever the least fit individual in a competition group itself is replaced, the FitMin( ) value associated with the competition group is updated correspondingly. The FitMin( ) values are needed for comparing to the fitness estimation of individuals coming up from the next lower experience layer but with the similar partition tag. In another embodiment, each competition group in an experience layer can instead contain a pointer to the least fit individual in the competition group, and the comparison method can obtain the competition group minimum fitness from that individual itself. In general, each competition group has associated with it an "indication" of the minimum fitness in the competition group. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication."

In one embodiment, the experience layers in candidate individual pool 116 define separate regions of memory, and the individuals having experience levels within the range of each particular layer are stored physically within that layer. Preferably, however, the experience layers are only implied by the layer parameters, and the individuals can actually be located anywhere in memory. In one embodiment, the individuals in candidate individual pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate individual pool 116 using the SQL "insert" statement, and individuals being discarded can be deleted using the SQL "delete" statement. In another embodiment, the individuals in candidate individual pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

Figure 3:
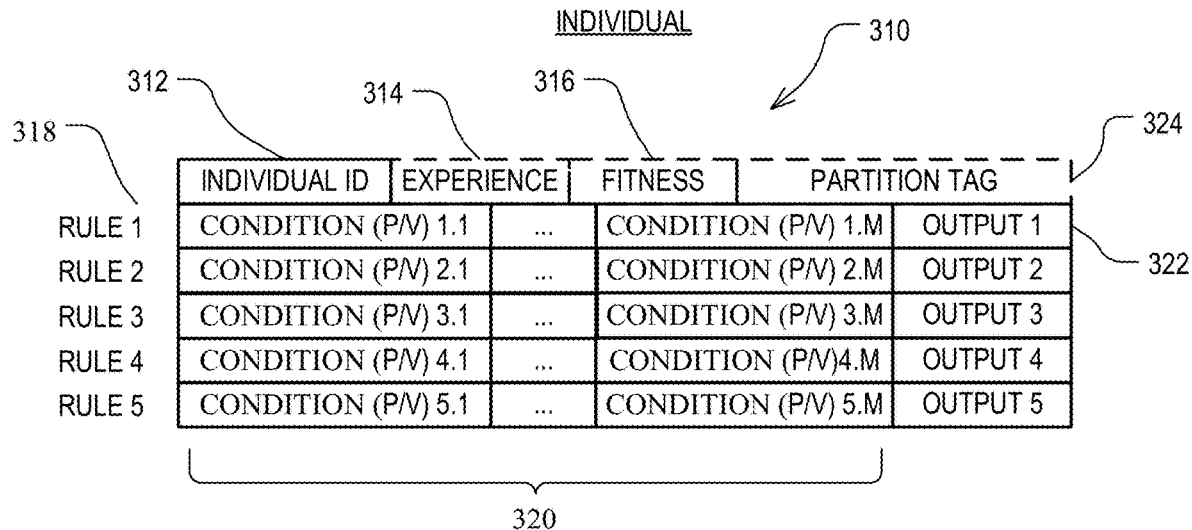
FIG. 3 is a symbolic drawing of an individual in either the candidate individual pool or the production individual population of FIG. 1, according to an embodiment of the invention.

FIG. 3 is a symbolic drawing of an individual 310 in either the candidate individual pool 116 or the production individual population 122. As used herein, an "individual" is defined by its contents. An individual created by procreation is considered herein to constitute a different individual than its parents, even though it retains some of its parents' genetic material. In this embodiment, the individual identifies with certain properties and their corresponding values, such as an ID 312, a current fitness estimate 316, an experience level 314, and one or more partition tags 324, each data item of which is optional for individuals in the production individual population 122. An individual 310 also includes one or more "rules" 318, each of which contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its overall fitness estimate 316 is determined by fitness function 120, averaged (or otherwise combined) over the all the trials.

The partition tag 324 of the individuals is dependent on a property of individuals other than their testing experience. The training system 110 selects individuals for discarding in dependence of their partition tag. When an individual graduates to a higher experience layer, it competes for a spot in the competition group in the higher experience layer, associated with the same partition tag as the individual.

In one embodiment, the partition tag 324 can be the individual's ancestry count. In one embodiment, the partition tag can be dependent on the genotypic or phenotypic properties of the individuals. In one embodiment, the partition tag can be dependent on the diversity measure of the individual.

Also as used herein, a "result" is the combination of outputs produced by an individual in response to a single data sample (either during training or in production), and the "performance" of an individual is a measure of how good the "result" was on that single sample. "Experience" level is a count of the number of samples on which the individual has been tested, though, in systems that discard duplicate tests, it is a count of the number of unique samples on which the individual has been tested.

A rule is a conjunctive list of conditions in association with an output. In the embodiment of FIG. 3, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a healthcare embodiment, an individual can be thought of as a set of rules predicting a patient's future state, given the patient's current and past state. In an embodiment, the set of rules may classify a patient's current state based on current and past state. The parameters on which the rules are based can be a patient's vital signs, and past treatment and medication history, for example. An example rule is as follows:

condition 1.1: pulse[t]>=120
condition 1.2: blood pressure[t-1]>=120
condition 1.3: blood pressure[t-6]<90
Output: high blood pressure related event
If condition 1.1 and condition 1.2 and condition 1.3, then Output.

The training data is arranged in the database 114 as a set of samples, each with parameters and their values, as well as sufficient information to determine a result that can be compared with an assertion made by an individual on the values in the sample. In one embodiment, the output is explicit, for example, a number set out explicitly in association with the sample. In such an embodiment, the fitness function can be dependent upon the number of samples for which the individual's output matches the result of the sample. In another embodiment, the result may not be present in the test data itself, but rather derivable from the test data.

Figure 4:
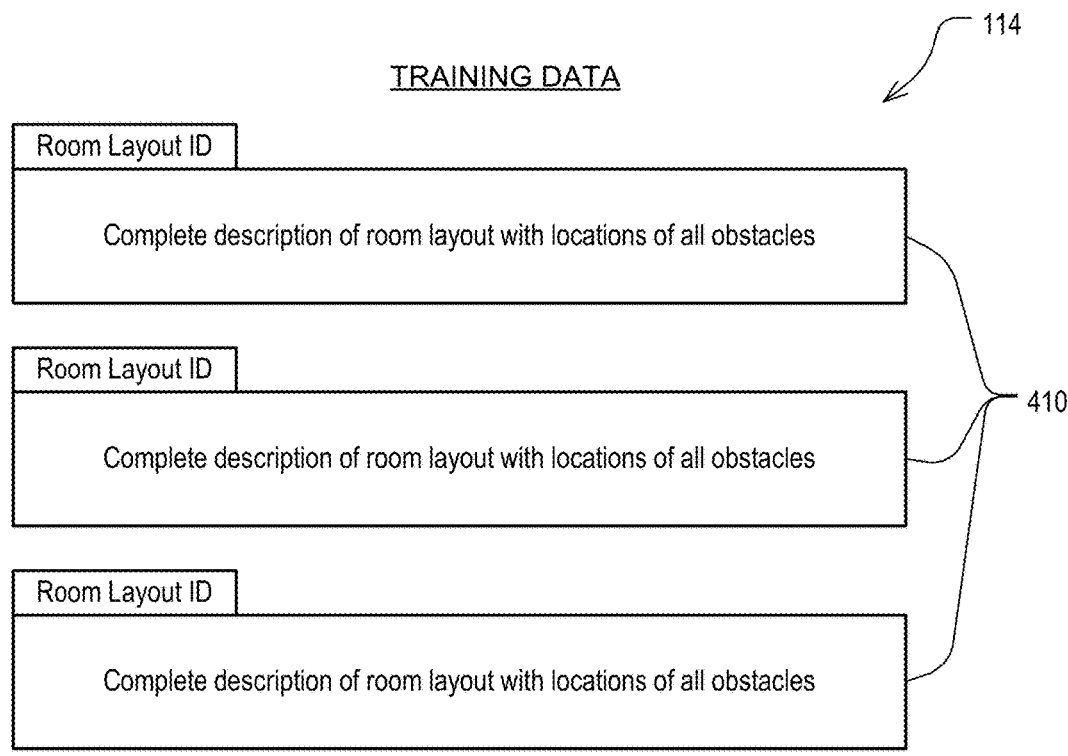
FIG. 4 is a symbolic drawing indicating how the training data database is organized, according to an embodiment of the invention.

FIG. 4 is a symbolic drawing indicating how the training data is organized in the database 114. The illustration in FIG. 4 is for an embodiment in which the problem is to find an algorithm for controlling a robot to cross a room most quickly, and it will be understood how it can be modified for use in other environments. Referring to FIG. 4, three samples 410 are shown. Each sample includes a complete description of an example room layout with locations of all obstacles.

Training System

Figure 5:
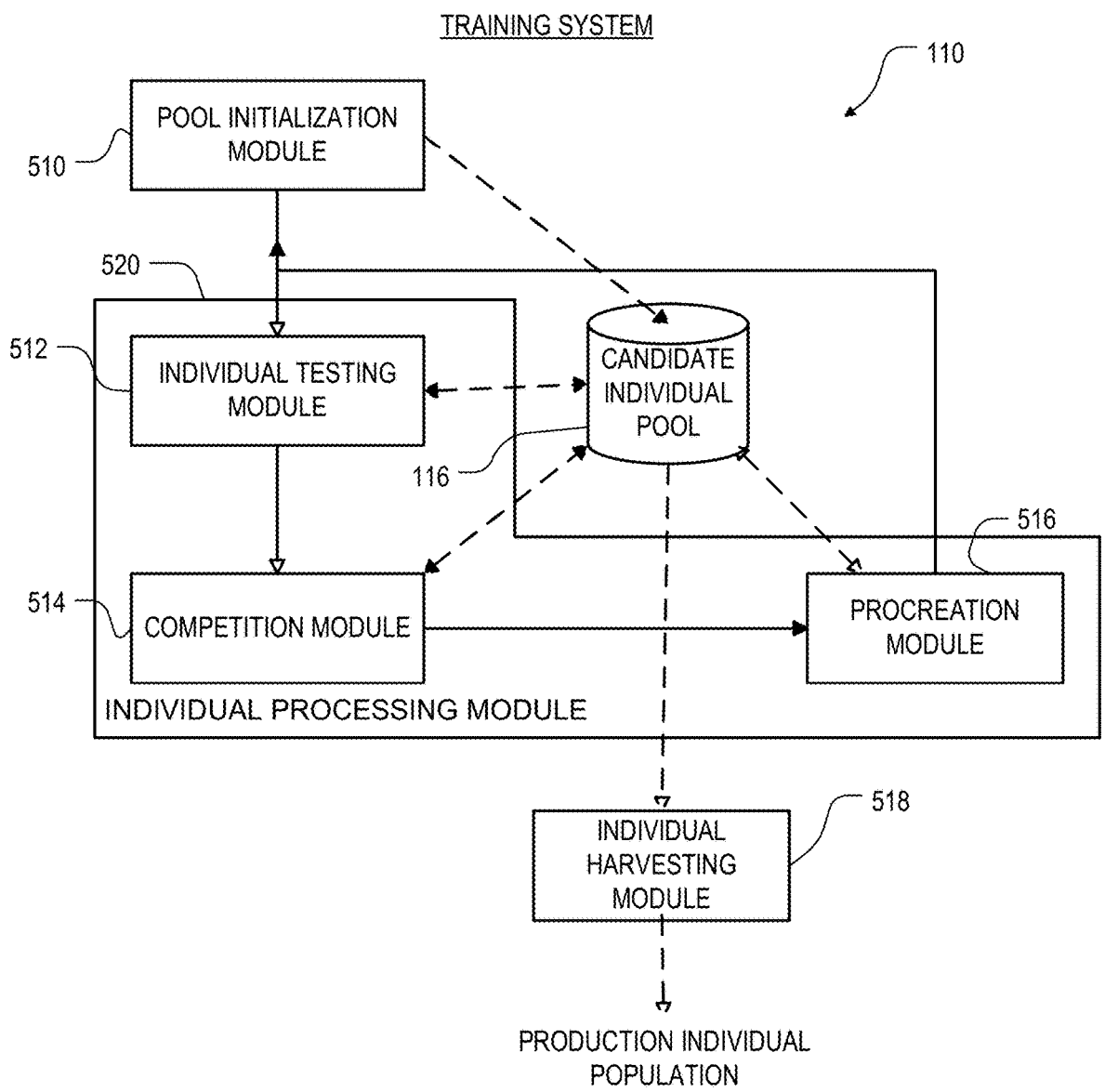
FIG. 5 illustrates modules that can be used to implement the functionality of the training system in FIG. 1, according to an embodiment of the invention.

FIG. 5 illustrates various modules that can be used to implement the functionality of training system 110 (FIG. 1). Candidate individual pool 116 is also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules," which themselves can be considered herein to constitute modules. In particular, the individual testing module 512, competition module 514, and procreation module 516 are also considered herein to be sub-modules of an individual pool processor module 520. The blocks in FIG. 5 designated as modules can also be thought of as flowchart steps in a method.

Referring to FIG. 5, the candidate individual pool 116 is initialized by pool initialization module 510, which creates an initial set of candidate individuals in $L_0$ of the individual pool 116. These individuals can be created randomly, or in some embodiments, a priori knowledge is used to seed the first generation. At the start, all individuals are initialized with an experience level of zero and a fitness estimate that is undefined.

Individual testing module 512 then proceeds to test the population in the individual pool 116 on the training data 114. Only a subset of the population in the individual pool 116 is tested at this point. As used herein, the term "subset," unless otherwise qualified, includes both proper and improper subsets as well as the null set. However, for the reasons explained above, the subset which is tested at this point is a non-null subset which includes only those individuals that have not yet reached the top layer $L_T$ of the elitist pool 118 (of which there are none initially). Each individual in the subset undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least $ExpMin(L_1)$ trials for each individual, to enable the initial individuals to qualify for consideration for the first layer of the elitist pool 118. Note there is no requirement that all individuals undergo the same number of trials.

After the tests, individual testing module 512 updates the fitness estimate associated with each of the individuals tested. In an embodiment, the fitness estimate may be an average of the results of all trials of the individual. In this case, the "fitness estimate" can conveniently be indicated by two numbers: the sum of the performance measures of all trials of the individual, and the total number of trials that the individual has experienced. The latter number may already be maintained as the experience level of the individual. The fitness estimate at any particular time can then be calculated as follows:

$$\text{fitness estimate} = \frac{\sum_{i=1}^{n} \text{performance measure}_i}{n},$$

where performance measure$_i$ is the individual's performance measure when tested on data sample i, and n is the number of data samples on which the individual has been tested, given by the individual's experience level. In an embodiment such as this, "updating" of the fitness estimate can involve merely adding the performance measures from the most recent trials to the prior sum.

In another embodiment, the fitness estimate is capped at a certain level. In other words, for positive values of non-weighted Fitness:

fitness estimate=Min(CAP_VALUE, non-weighted Fitness).

This technique, which applies a form of weighting which is piecewise rather than smooth, has the effect of reducing the system's sensitivity to very large outlier values.

Once the fitness estimate and experience level are updated in the candidate individual pool for each tested individual, the competition module 514 performs competition among individuals, moves some individuals between experience layers and competition groups, and may discard other individuals. More detail about the competition process is provided below. After the candidate individual pool 116 has been updated, a procreation module 516 selects a random subset of individuals from which to evolve new individuals. Only individuals in the elitist pool may be selected to procreate. Any conventional or future-developed technique can be used for procreation. In an embodiment, conditions, outputs, or rules from parent individuals are combined in various ways to form child individuals, and then, occasionally, they are mutated. The combination process, for example, may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the individual pool 116. Preferably, after new individuals are created by combination and/or mutation, the parent individuals are retained. In this case, the parent individuals also retain their experience level and fitness estimates, and remain in their then-current elitist pool layers. In another embodiment, the parent individuals are discarded.

After procreation, individual testing module 512 operates again on the updated individual pool 116. The process continues repeatedly.

Sometime after the top layer of elitist pool 118 is full, individuals can be harvested for use by production system 112. Individual harvesting module 518 retrieves individuals for that purpose. In one embodiment, individual harvesting module 518 retrieves individuals periodically, whereas in another embodiment it retrieves individuals only in response to user input. Individual harvesting module 518 selects only from the top layer $L_T$, and can apply further selection criteria as well in order to choose desirable individuals. For example, in one embodiment it selects only the fittest individuals from $L_T$. In the same or another embodiment the partition tag of individuals is taken into account when selecting for harvesting. In an embodiment where novelty/diversity measure is used as partition tags, a subset of individuals selected as parents from that pool will be a diverse set of parents from which to procreate. In some embodiments where ancestry count is used as partition tags, the ancestry counts of the individuals can be used to weight the likelihood that an individual is selected for procreation. For example, individuals having more than a threshold ancestry count might be weighted so as to increase or decrease the likelihood that they will be selected for procreation, depending on whether it is desired to amplify or attenuate the effects of greater ancestry count. More generally, the procreation module can apply a weight to the random selection which depends in some way upon the individual's partition tag. Other criteria will be apparent to the reader. The individuals may also undergo further validation as part of this further selection process, by testing on historical data not part of training data 114. The individuals selected by the individual harvesting module 518 are written to the production individual population database for use by production system 112 as previously described.

As mentioned above, competition module 514 manages the graduation of individuals from a competition group in lower experience layers in the candidate individual pool 116, up to competition groups with similar partition tag in higher experience layers. This process can be thought of as occurring one individual at a time, as follows. First, a loop is begun through all individuals whose experience level has changed since the last time competition module 514 was executed. If the current individual's experience level has not increased sufficiently to qualify it for the next experience layer in the elitist pool 118, then the individual is ignored, and the next one is considered. If the current individual's experience level has increased sufficiently to qualify it for a new experience layer, then the competition module 514 determines whether the competition group with similar partition tag in the target experience layer is already at quota. If not, then the individual is simply moved into that competition group in the target experience level. If the competition group with similar partition tag in the target experience layer is full, then the competition module 514 determines whether the fitness estimate of the current individual exceeds that of the least fit individual in the target competition group of the target experience layer. If so, then the least fit individual in the target competition group is discarded, and the current individual is moved up into the competition group with similar partition tag in the target experience layer. If not, then the current individual is discarded. The process then moves on to consider the next individual in sequence. Note that while individuals typically move up by only one experience layer at a time, that is not a requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target competition group in the target experience layer can further include a test of whether the current individual's fitness estimate satisfies the elitist pool minimum fitness. Typically this latter test is applied only to individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer $L_i$ is being considered for layer $L_{i+1}$ at the same time that an individual in layer $L_{i-1}$ is being considered for layer $L_i$. If the former test occurs first, then a hole will be opened in layer $L_i$ and the individual graduating from layer will be promoted to layer $L_i$ automatically. If the latter test occurs first, then the individual graduating from layer $L_{i-1}$ will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 6:
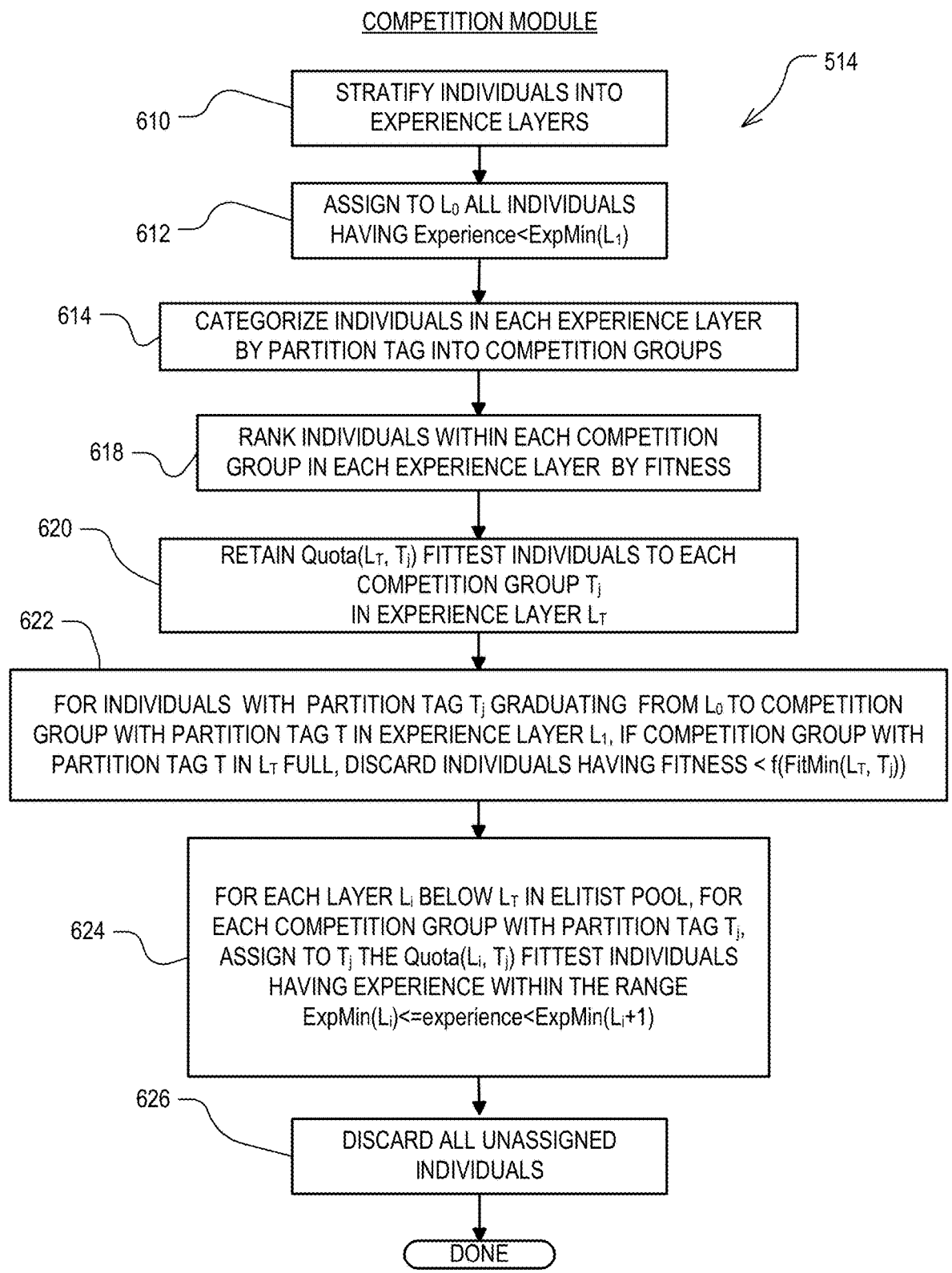
FIG. 6 illustrates a method of operation of the competition module in FIG. 5, according to an embodiment of the invention.

FIG. 6 illustrates a bulk-oriented method of operation of competition module 514. In the embodiment of FIG. 6, the layers in the candidate individual pool 116 are disbanded and reconstituted each time the competition module 514 executes. These executions of competition module 514 are sometimes referred to herein as competition "events," and each comparison made between the fitness estimate of one individual and that of another is sometimes referred to herein as a comparison "instance."

In step 610, all the individuals in candidate individual pool 116 are stratified into their experience layers. In step 612, all individuals whose experience level is still within that of $L_0$, are assigned automatically to $L_0$. In step 614, individuals within each experience layer $L_1$-$L_T$ are further categorized by their partition tag into competition groups $T_1$-$T_N$. In step 618, within each experience layer $L_1$-$L_T$, individuals in each competition group $T_1$-$T_N$ are ranked according to their fitness estimates. In step 620, of those individuals in each competition group $T_j$ in experience layer $L_T$ whose experience level is at least equal to the minimum experience level of the $L_T$ experience layer of the elitist pool 118, the Quota($L_T$, $T_j$) fittest are assigned to the competition group $T_j$ in experience layer $L_T$. Note that this step could exclude some individuals with top layer experience, as individuals coming up from competition group $T_j$ in experience layer $L_{T-1}$ can supplant less fit individuals that were previously in the competition group $T_j$ in experience layer $L_T$.

Step 622 implements the policy that once a competition group $T_j$ in $L_T$ is full; no individuals are allowed into the elitist pool 118 with partition tag $T_j$ unless they are at least as fit as some predetermined function f( ) of the minimum fitness of the competition group $T_j$ in experience layer $L_T$. In step 622, therefore, if competition group $T_j$ in $L_T$ is full, all individuals graduating from competition group $T_j$ in $L_0$ to competition group $T_j$ in $L_1$ whose fitness estimate is less than f(FitMin($L_T$, $T_j$)) are discarded. Variations of step 622 to implement variations of the elitist pool minimum fitness policy, will be apparent. In step 624, for each layer $L_i$ below the top layer $L_T$, all the individuals in each competition group $T_j$ in the elitist individual pool 118 having experience level within the range associated with layer $L_i$ are considered. Of these individuals, only the Quota($L_i$, $T_j$) fittest individuals are assigned to competition group $T_j$ in experience layer $L_i$. In step 626, all individuals remaining in elitist individual pool 118 which were not assigned to specific layers in steps 612, 620 or 626, are discarded.

As used herein, a phrase such as "only the five fittest individuals," need not necessarily fill all five places. That is, if there are only three individuals to consider, the phrase is satisfied if all three individuals are assigned places. Thus it can be seen that step 620 includes both a policy that individuals entering a layer that is already at quota must compete for their place in that layer, as well as a policy that individuals entering a layer that is not yet full are promoted to that layer automatically. It can also be seen that steps 624 and 626 together implement a policy that fitness comparisons are made only among individuals having roughly the same experience.

In some embodiments, the competition module may discard individuals further in dependence upon other predetermined criteria, such as the diversity or novelty measure of the individuals. More details can be found in the U.S. Non-provisional patent application Ser. No. 15/146,846 which is incorporated herein by reference.

Computer Hardware

Figure 7:
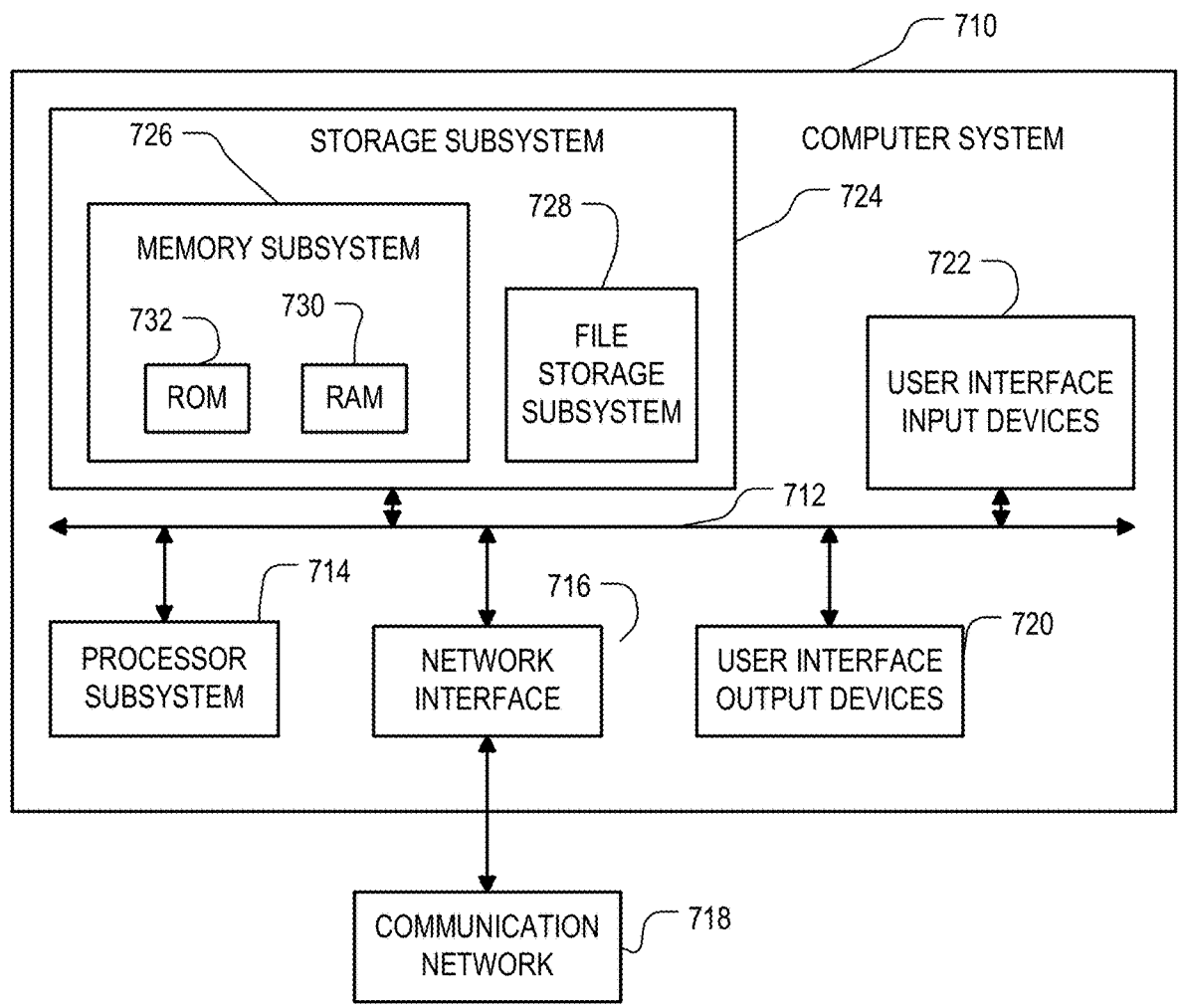
FIG. 7 is a simplified block diagram of a computer system that can be used to implement either or both of the training system or production system in FIG. 1, and/or the training server and clients in FIG. 8, according to an embodiment of the invention.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in a specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the robot learning environment, for example, the communication network 718 may transmit control signals to actuators on the robot.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate individual pool 116, the training database 114, and/or the production individual population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read-only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer," execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an individual's fitness can be voluminous. Therefore, even with modern high processing power and large memory capacity computers, achieving quality results within a reasonable time is often not feasible on a single machine. A large individual pool also requires a large memory and high processing power. In one embodiment, therefore, a client/server model is used to provide scaling in order to achieve high-quality evaluation results within a reasonable time period. Scaling is carried out in two dimensions, namely in pool size as well as in the evaluation of the same individual to generate a more diverse individual pool so as to increase the probability of finding fitter individuals. In the client/server embodiment, the individual pool is distributed over a multitude of clients for evaluation. Each client maintains its own client-centric individual pool using data from training database 114, which it may receive in bulk or periodically on a sustained and continuing basis. Individuals that satisfy one or more predefined conditions on a client computer are transmitted to the server to form part of a server-centric individual pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein a partial evaluation) for an individual is transferred back to the server. The server merges the partial evaluation results of an individual with that individual's fitness estimate at the time it was sent to the clients to arrive at an updated fitness estimate for that individual in the server-centric individual pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool but also creating a new generation of individuals and moving the evolutionary process forward locally. Thus clients maintain their own client-centric individual pools which need not match each other or the server-centric individual pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
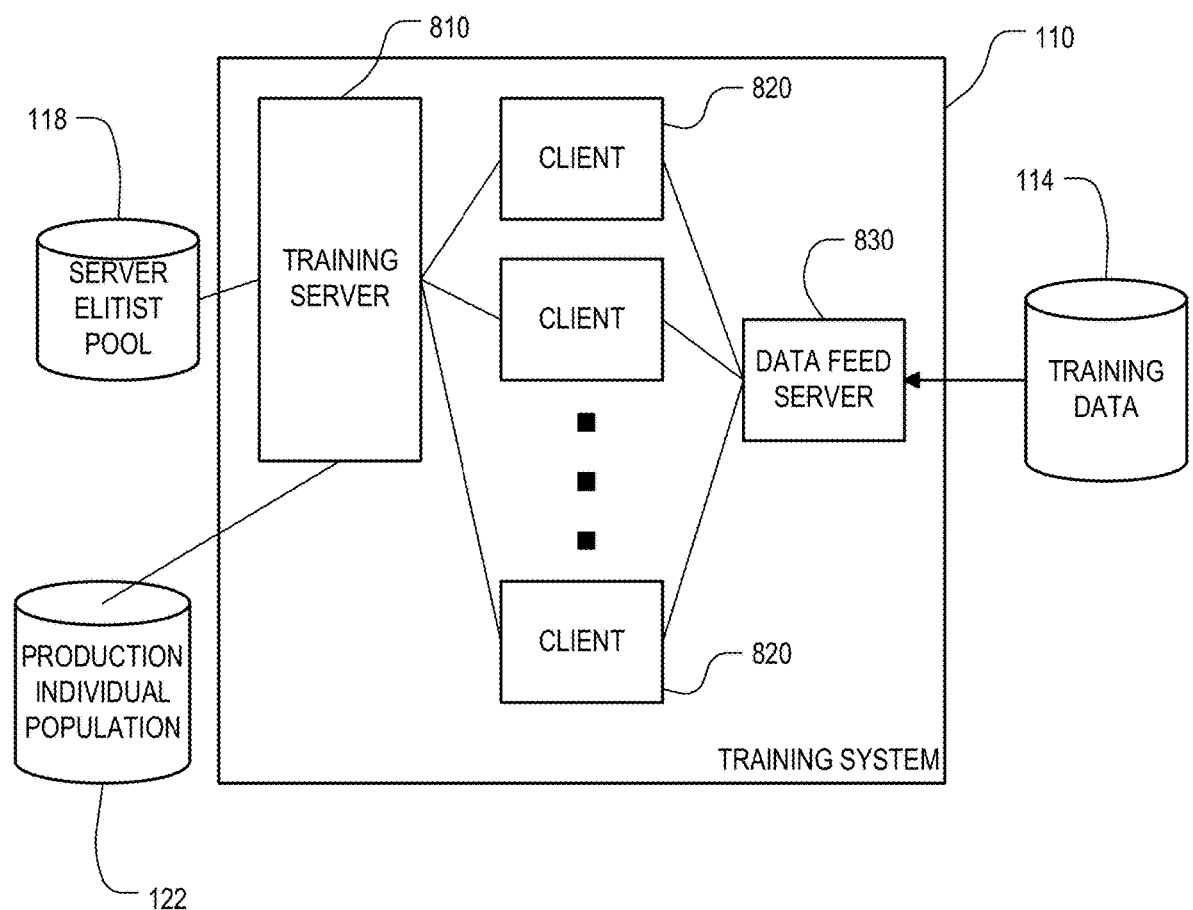
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computers, or the like. An example system may have hundreds of thousands of clients. In an embodiment, the training server and/or each of the client computers can have the structure of FIG. 7 or any of its variations as described above. The client computers 820 communicate with the training server 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810.

Figure 9:
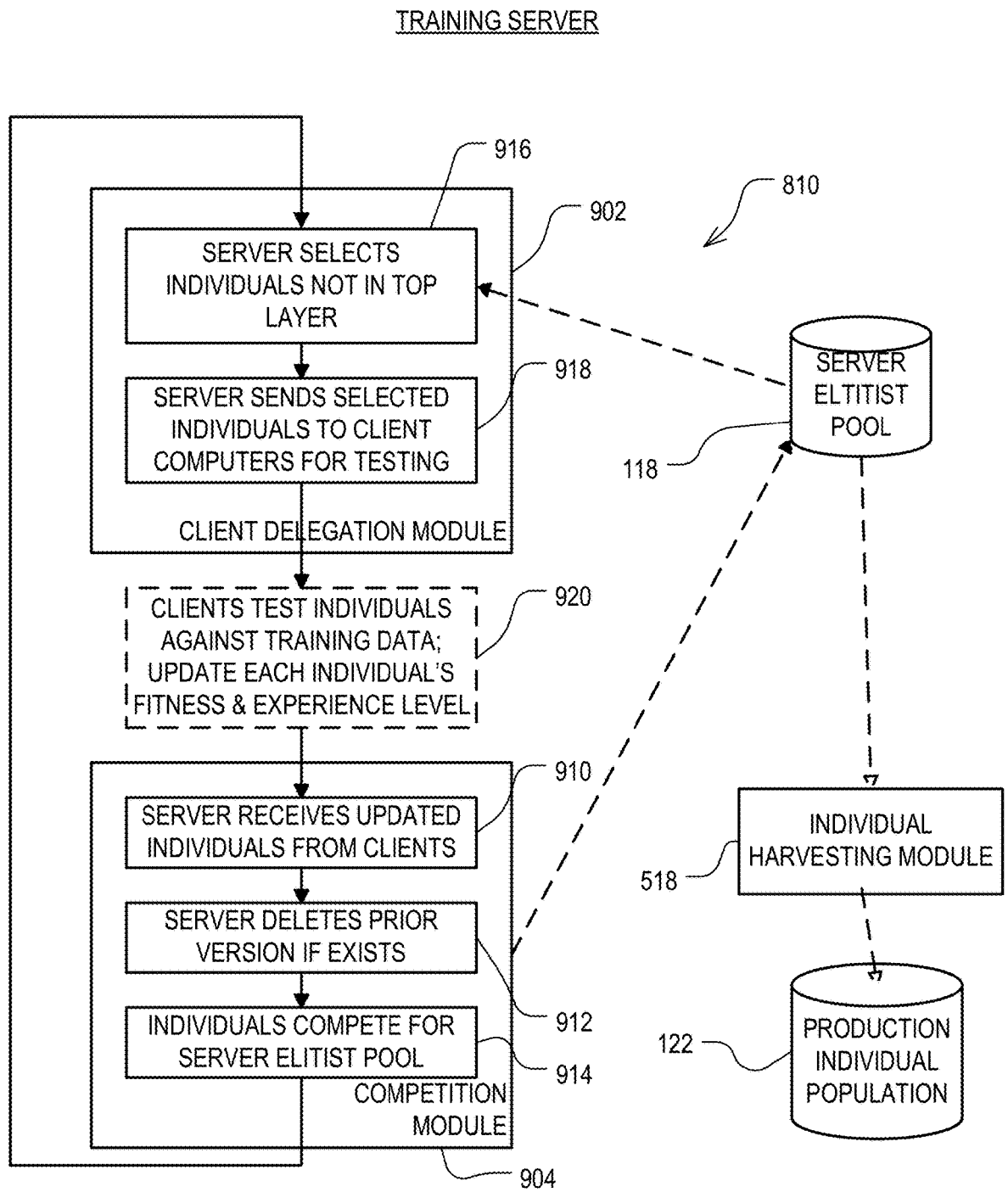
FIG. 9 illustrates modules that can be used to implement the functionality of training server of FIG. 8, according to an embodiment of the invention.

FIG. 9 illustrates various modules that can be used to implement the functionality of training server 810 (FIG. 8). Elitist pool 118 and production individual population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the client/server model enforces competition within its own server-centric elitist pool 118 when individuals are returned from clients. FIG. 9 illustrates various modules that can be used to implement the functionality of training server 810. Like the embodiment of FIG. 5, the training server 810 includes a competition module 904. It also includes individual harvesting module 518, which may be the same as in FIG. 5. It also includes individual testing and procreation functionality, but these are combined into a single client delegation module 902 in FIG. 9. The client delegation module 902 and the competition module 904 constitute two sub-modules in an individual pool processor module (not shown specifically in FIG. 9). The FIG. 9 embodiment does not include a pool initialization module in the sense of FIG. 5, since as mentioned, the clients initialize their own individual pools.

Referring to FIG. 9, in step 910, the competition module 904 receives individuals from one or more of the client computers 820. These individuals may arrive asynchronously, if and when client computers have them available to transmit. Some individuals previously sent out for testing may never return. Individuals may arrive individually, or in bunches. If an arriving individual is new to the training server 810 (and, in some embodiments, also if the arriving individual is already known to the training server 810), the training server 810 also receives and stores the partition tag of the arriving individual. At various times determined by competition module 904, after at least one individual has arrived, competition module 904 proceeds to step 912 to begin a competition "event."

In step 912, competition module 904 determines whether each incoming individual is a new one or a return of an individual that the server previously sent out for testing. This determination can be made on the basis of individual IDs 312 (FIG. 3). If the latter, then the training server 810 merges the newly received copy of the individual into the prior version in the server-centric elitist pool 118. In one embodiment, the merging step involves merely replacing the prior copy of the individual in the server-centric elitist pool 118, with the one newly received. In a variation of that embodiment, replacing may involve merely updating the experience level and the fitness estimation of the prior copy of the individual in the server-centric elitist pool 118.

In step 914 the incoming individual (if new) or the updated individual (if merged) competes for its position in the server elitist pool 118. The same variations and rules of competition apply here as they do for the competition module 514 in the server-only model. That is if the competition group in the now-appropriate experience layer is full, the fitness estimate of the incoming individual is compared to the least fit individual in the now-appropriate experience layer and competition group for the incoming individual, and only the fitter of the two is retained. The other is discarded. An elitist pool minimum fitness policy can be applied here as well, based on a server-centric minimum fitness level. Alternatively, the entire server elitist pool 118 can be disbanded and reconstituted at each competition event, as described in more detail with respect to FIG. 6.

In the client delegation module 902, in step 916, the server 810 selects individuals from the server-centric elitist pool 118 and sends them out to one or more clients 820 for further testing (step 918). As in the server-only embodiment, the client delegation module 902 is restricted from selecting for further testing individuals already in the top layer of the elitist pool 118. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and the client may perform more than one battery of trials on the individual before returning it to the server. In the latter embodiment, the client has its own client-centric view of a testing battery.

In step 920 the client machines 820 test the individuals against training data from the data feed server 830 and update each individual's fitness and experience level locally. Step 920 is shown in broken lines in FIG. 9 because it is performed by clients rather than training server 810. At various subsequent times, the server 810 again receives back updated individuals from the clients in step 910 and repeats the process of FIG. 9.

The operation of the client computers 820 is the same as that previously described with respect to FIGS. 5 and 6, with the exception that individuals are provided both by the pool initialization module 510, as well as from the training server 810. The candidate individual pool 116 in a client computer 820 is client-centric, and includes all candidate individuals being considered by the clients, including those that do not yet have sufficient experience to be considered for the elitist pool in the client computer. The candidate individual pools in the clients are nested experience layer-oriented as shown in FIG. 2, and for convenience, the experience layers in a client computer are sometimes designated herein with a top experience layer numbered CT rather than T, and with layers designated $CL_0$-$CL_{CT}$. The competition groups inside the experience layers in a client computer are sometimes designated herein as $CT_0$-$CT_{CN}$. None of the experience and competition group parameters in the client-centric individual pool, including the number of layers, need be the same as their corresponding parameters in other clients or in the server. Preferably the candidate individual pool 116 in the client computers 820 are implemented using linked lists, whereas the elitist pool 118 in the server 810 are implemented using a DBMS, both as previously described.

Unlike the single server embodiment, the individual testing module in the client computer 820 does not prevent further testing of individuals that have reached the top layer $CL_{CT}$ of the client-centric elitist pool 820. The individual harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 by requiring them to compete for their position in the server-centric elitist pool 118 of the training server 810. Note further that because of competition in the client computer 820, some individuals that the training server 810 sent to the client computer 820 for further testing will never be returned to the training server 810. In this case, the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

Procreation

As mentioned, the procreation events that take place in procreation module 516. During procreation, individuals with different partition tags can procreate and share their genetic material, thereby avoiding situations in which the individuals evolved with different partition tags remain entirely separate, and individuals associated with one nested tag do not know how to address a part of the problem addressed in an individual with a different partition tag.

Figure 10:
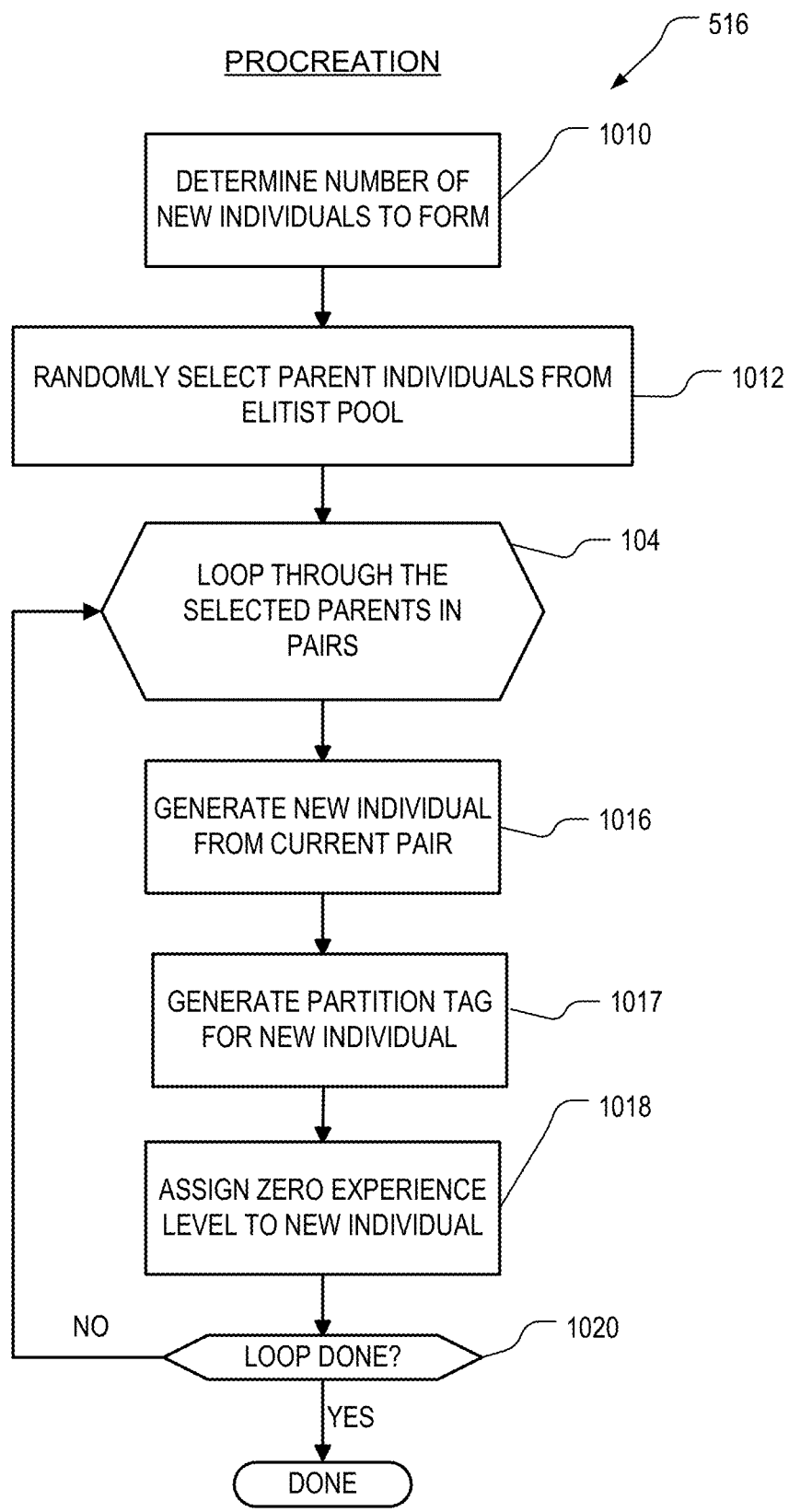
FIG. 10 is a flowchart of the procreation module in FIG. 5 taking individual partition tags into account during procreation, according to an embodiment of the invention.

FIG. 10 is a flowchart illustrating an embodiment of this feature in more detail. Referring to FIG. 10, in step 1010 the procreation module 516 determines how many new individuals to form in the current procreation event. For example, the number in one embodiment is calculated as 5% of the total number of individuals in the elitist pool.

In step 1012, the procreation module 516 selects parent individuals from the elitist pool to use in the procreation process. Typically the individuals are selected randomly from throughout the elitist pool, though in an experience layered embodiment they might be selected only from one or more layers of the elitist pool. In some embodiments, the partition tag 324 of the individuals is used to weight the likelihood that an individual is selected in this step. For example, in embodiments where ancestry count is used as the partition tag, individuals having more than a threshold ancestry count might be weighted so as to increase or decrease the likelihood that they will be selected in this step, depending on whether it is desired to amplify or attenuate the effects of greater ancestry count. More generally, the procreation module 516 can apply a weight to the random selection of the parent individuals based on the parent individual's partition tags.

In step 1014, the procreation module 516 begins a loop through the selected parents. Preferably parents are selected in pairs, and each new individual is formed from exactly two parents. In another embodiment, however, new individuals can be formed from a single parent individual, or from three or more parent individuals. In general, a "set" of one or more parents is used in the formation of each new individual by procreation.

In step 1016, a new individual is formed from the current set of parents. In step 1017, a new partition tag is generated for the new individual formed in step 1016. For example, in embodiments where ancestry count is used as the partition tag, the partition tag for the new individual will be a function of the ancestry counts of the parent individuals. In embodiments where novelty measure is used as the partition tag, novelty measure of the newly-procreated individual is computed with respect to the behaviors of individuals in the candidate individual pool.

Any method of procreation can be used, such as those set forth elsewhere herein. In step 1018 a zero experience level is assigned to the new individual, and in step 1020 it is determined whether there are more sets of parents selected to procreate. If so, then procreation module 516 returns back to step 1014 to generate another new individual by procreation.

Alternative Embodiments

There are many embodiments evolving individuals in an evolutionary algorithm. The approach described herein may be implemented by any of the following embodiments.

In an embodiment, the evolutionary algorithm is distributed across multiple computers. The computers may be assigned a role of coordinator, mid-level coordinator, or evolutionary engine in which an evolutionary engine initializes, procreates, tests, and scores individuals, and coordinators compare individuals across the evolutionary engine. This is a federated approach. See, for example, the above-incorporated U.S. Pat. No. 9,466,023 (GNFN 3100-1).

In an embodiment, the number of training data samples or an individual is tested against is tracked in an indication of experience level, and only those individuals with similar experience levels are permitted to compete with each other for a place in the candidate pool. See, for example, the above-incorporated U.S. Pat. No. 8,909,570 (GNFN 3010-1). The individuals selected as parents for procreation are selected from among the best scoring of the most experienced individuals.

In an embodiment, parents involved in procreation are removed from the candidate pool, and in other embodiments, they remain in the candidate pool.

In an embodiment, an individual's fitness score may be retained and further refined across generations as an individual is tested against new training data. In an embodiment, previous fitness scores are not used, and a new fitness score is determined based only on the performance of the testing data of the current generation.

In an embodiment, an individual can also contain or identify a history of the separate fitness trials to which the individual has been subjected. Such a fitness history can be used to avoid re-testing the individual on the same data sample or can be used to remove the effect of duplicate tests performed on an individual in different testing batteries before merging the fitness evaluations. It can also be used to help diversify the candidate pool, by comparing or weighting individuals not only on their overall fitness evaluations but also on the way they reached their overall fitness evaluations. Fitness trial history also can be taken into account when filtering the final pool of individuals for selection for deployment.

Many other variations will be apparent to the reader.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify."

Also as used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, individual partition tag 324 for individuals in candidate individual pool 116 can in some embodiments be made available for external retrieval and/or analysis through the use of an API (not shown). As another example, partition tag 324 can be used as a measure of convergence of the candidate individual pool. For example, in one embodiment, a system periodically computes an Average Fitness Leap Per Ancestor Count Increment of the candidate population. If the rate of change of such a measure is in continual decline down to a certain threshold, convergence is indicated, and further procreation or evaluation of the population is terminated. Further, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A computer-implemented method for discovering solutions to a provided problem, comprising the steps of:
    providing a computer system having a memory having a candidate pool database identifying a pool of candidate individuals, each candidate individual identifying a potential solution to the problem, each candidate individual further having associated therewith a respective fitness estimate, a respective testing experience level, and a respective value for a partition tag, wherein the candidate pool database includes T experience layers numbered $L_1$-$L_T$ with T>1 and each i'th one of the experience layers in $[L_0 \ldots L_{T-1}]$ contains only individuals with a respective range of testing experience, ExpMin($L_i$) to ExpMax($L_i$), each ExpMin($L_{i+1}$) >ExpMax($L_i$);
    a computer system testing individuals from the pool of candidate individuals against training data;
    a computer system updating the fitness estimates for tested ones of the individuals, in dependence upon the results of such testing;
    a computer system assigning each candidate individual in the pool of candidate individuals into one of a plurality of competition groups in dependence upon the testing experience level and the partition tag value of the candidate individual, wherein for each experience layer $L_1$-$L_T$ there are multiple competition groups associated therewith; and
    a computer system selecting individuals for discarding from the pool of candidate individuals in dependence upon their assigned competition group.

2. The method of claim 1, wherein each of the candidate individuals is associated with values for a plurality of partition tags, and
    wherein the step of assigning comprises assigning each of the candidate individuals to one of the competition groups in dependence upon a combination of the plurality of partition tag values associated with the candidate individual.

3. The method of claim 1, wherein the each of the competition groups is associated with a range of partition tag values,
    and wherein assigning each candidate individual into a competition group comprises assigning the candidate individual to a competition group associated with a range of partition tag values that includes the partition tag value of the candidate individual.

4. The method of claim 1, wherein the partition tag of the candidate individual is a property of the individual.

5. The method of claim 1, wherein the partition tag of the candidate individual is an ancestry count, the partition tag value indicating a number of procreation events in the ancestry of the individual.

6. The method of claim 1, wherein the partition tag value of the candidate individual is a predefined measure of diversity of the candidate individual relative to other individuals in the candidate individual pool.

7. The method of claim 1, wherein the problem includes a plurality of sub-problems, and wherein the partition tag value identifies one of the sub-problems addressed by the candidate individual.

8. The method of claim 1, further comprising a step of:
generating a new candidate individual from one or more parent individuals, wherein the partitions tag of the new candidate individual is dependent upon the partition tags of the new candidate's parent individuals.

9. The method of claim 8, further comprising steps of:
including the new candidate individual to the candidate pool database; and
repeating the steps of testing, updating, assigning and selecting.

10. The method of claim 1, wherein selecting individuals for discarding from the pool of candidate individuals comprises:
discarding from a particular one of the competition groups the least fit individual in the particular competition group as indicated by the fitness estimates.

11. The method of claim 1, wherein selecting individuals for discarding from the pool of candidate individuals comprises:
discarding from each particular one of the competition groups in a subset of the competition groups the least fit individual in the particular competition group as indicated by the fitness estimates.

12. The method of claim 1, wherein selecting individuals for discarding is performed further in dependence upon other predetermined criteria.

13. A system for discovering solutions to a provided problem, comprising:
a memory storing a candidate pool database identifying a pool of candidate individuals, each candidate individual identifying a potential solution to the problem, each candidate individual further having associated therewith a respective fitness estimate, a respective testing experience level, and a respective value for a partition tag, wherein the candidate pool database includes T experience layers numbered $L_1$-$L_T$, with T>1 and each i'th one of the experience layers in $[L_0 \ldots L_{T-1}]$ contains only individuals with a respective range of testing experience, $ExpMin(L_i)$ to $ExpMax(L_i)$, each $ExpMin(L_{i+1})>ExpMax(L_i)$ and
a processing unit which:
tests individuals from the pool of candidate individuals against training data,
updates the fitness estimates for tested ones of the individuals, in dependence upon the results of such testing,
assigns each candidate individual in the pool of candidate individuals into one of a plurality of competition groups in dependence upon the testing experience level and the partition tag value of the candidate individual, wherein for each experience layer $L_1$-$L_T$ there are multiple competition groups associated therewith, and
selects individuals for discarding from the pool of candidate individuals in dependence upon their assigned competition group.

14. The system of claim 13, wherein each of the candidate individuals is associated with values for a plurality of partition tags, and
wherein the step of assigning comprises assigning each of the candidate individuals to one of the competition groups in dependence upon a combination of the plurality of partition tag values associated with the candidate individual.

15. The system of claim 13, wherein the each of the competition groups is associated with a range of partition tag values,
and wherein assigning each candidate individual into a competition group comprises assigning the candidate individual to a competition group associated with a range of partition tag values that includes the partition tag value of the candidate individual.

16. The system of claim 13, wherein the partition tag of the candidate individual is a property of the individual.

17. The system of claim 13, wherein the partition tag of the candidate individual is an ancestry count, the partition tag value indicating a number of procreation events in the ancestry of the individual.

18. The system of claim 13, wherein the partition tag value of the candidate individual is a predefined measure of diversity of the candidate individual relative to other individuals in the candidate individual pool.

19. The system of claim 13, wherein the problem includes a plurality of sub-problems,
and wherein the partition tag value identifies one of the sub-problems addressed by the candidate individual.

20. The system of claim 13, wherein the processing unit generates a new candidate individual from one or more parent individuals,
and wherein the partitions tag of the new candidate individual is dependent upon the partition tags of the new candidate's parent individuals.

21. The system of claim 20, wherein the processing unit:
includes the new candidate individual to the candidate pool database; and
repeats the steps of testing, updating, assigning and selecting.

22. The system of claim 13, wherein selecting individuals for discarding from the pool of candidate individuals comprises:
discarding from a particular one of the competition groups the least fit individual in the particular competition group as indicated by the fitness estimates.

23. The system of claim 13, wherein selecting individuals for discarding from the pool of candidate individuals comprises:
discarding from each particular one of the competition groups in a subset of the competition groups the least fit individual in the particular competition group as indicated by the fitness estimates.

24. The system of claim 13, wherein selecting individuals for discarding is performed further in dependence upon other predetermined criteria.

25. A non-transitory computer readable medium having stored thereon a plurality of instructions for discovering solutions to a provided problem, the plurality of instructions when executed by a processing unit causing the processing unit to:
provide in a computer system memory a candidate pool database identifying a pool of candidate individuals, each candidate individual identifying a potential solution to the problem, each candidate individual further having associated therewith a respective fitness estimate, a respective testing experience level, and a respective value for a partition tag, wherein the candidate pool database includes T experience layers numbered $L_1$-$L_T$, with T>1 and each i'th one of the experience layers in $[L_0 \ldots L_{T-1}]$ contains only individuals with a respective range of testing experience, $ExpMin(L_i)$ to $ExpMax(L_i)$, each $ExpMin(L_{i+1})>ExpMax(L_i)$;

test individuals from the pool of candidate individuals against training data;

update the fitness estimates for tested ones of the individuals, in dependence upon the results of such testing;

assign each candidate individual in the pool of candidate individuals into one of a plurality of competition groups in dependence upon the testing experience level and the partition tag value of the candidate individual, wherein for each experience layer $L_1$-$L_T$ there are multiple competition groups associated therewith; and select individuals for discarding from the pool of candidate individuals in dependence upon their assigned competition group.

26. A computer-implemented data mining system for discovering solutions to a provided problem, comprising:

a memory having a candidate pool database identifying a pool of candidate individuals, each candidate individual identifying a potential solution to the problem, each candidate individual further having associated therewith a respective fitness estimate, a respective testing experience level, and a respective value for a partition tag, wherein the candidate pool database includes T experience layers numbered $L_1$-$L_T$, with T>1 and each i'th one of the experience layers in $[L_0 \ldots L_{T-1}]$ contains only individuals with a respective range of testing experience, $\text{ExpMin}(L_i)$ to $\text{ExpMax}(L_i)$, each $\text{ExpMin}(L_{i+1})$>$\text{ExpMax}(L_i)$;

means for testing individuals from the pool of candidate individuals against training data;

means for updating the fitness estimates for tested ones of the individuals, in dependence upon the results of such testing;

means for assigning each candidate individual in the pool of candidate individuals into one of a plurality of competition groups in dependence upon the testing experience level and the partition tag value of the candidate individual, wherein for each experience layer $L_1$-$L_T$ there are multiple competition groups associated therewith; and means for selecting individuals for discarding from the pool of candidate individuals in dependence upon their assigned competition group.

* * * * *